United States Patent
Lord et al.

(10) Patent No.: US 8,811,638 B2
(45) Date of Patent: Aug. 19, 2014

(54) AUDIBLE ASSISTANCE

(75) Inventors: Richard T. Lord, Tacoma, WA (US); Robert W. Lord, Seattle, WA (US); Nathan P. Myhrvold, Medina, WA (US); Clarence T. Tegreene, Bellevue, WA (US); Roderick A. Hyde, Redmond, WA (US); Lowell L. Wood, Jr., Bellevue, WA (US); Muriel Y. Ishikawa, Livermore, CA (US); Victoria Y. H. Wood, Livermore, CA (US); Charles Whitmer, North Bend, WA (US); Paramvir Bahl, Bellevue, WA (US); Douglas C. Burger, Bellevue, WA (US); Ranveer Chandra, Kirkland, WA (US); William H. Gates, III, Medina, WA (US); Paul Holman, Seattle, WA (US); Jordin T. Kare, Seattle, WA (US); Craig J. Mundie, Seattle, WA (US); Tim Paek, Sammamish, WA (US); Desney S. Tan, Kirkland, WA (US); Lin Zhong, Houston, TX (US); Matthew G. Dyor, Bellevue, WA (US)

(73) Assignee: Elwha LLC, Bellevue, WA (US)

( * ) Notice: Subject to any disclaimer, the term of this patent is extended or adjusted under 35 U.S.C. 154(b) by 160 days.

(21) Appl. No.: 13/309,248

(22) Filed: Dec. 1, 2011

(65) Prior Publication Data
US 2013/0142365 A1    Jun. 6, 2013

(51) Int. Cl.
*H04R 25/00*    (2006.01)
*G10L 15/00*    (2013.01)

(52) U.S. Cl.
USPC .......................................... 381/312; 704/246

(58) Field of Classification Search
USPC ................. 381/312, 315, 320, 60; 455/556.1; 700/94; 704/246
See application file for complete search history.

(56) References Cited

U.S. PATENT DOCUMENTS

| | | | |
|---|---|---|---|
| 5,239,586 A * | 8/1993 | Marui | 704/270 |
| 6,157,727 A | 12/2000 | Rueda | |
| 6,226,389 B1 | 5/2001 | Lemelson et al. | |
| 6,304,648 B1 | 10/2001 | Chang | |
| 6,529,866 B1 * | 3/2003 | Cope et al. | 704/205 |
| 6,628,767 B1 | 9/2003 | Wellner et al. | |

(Continued)

OTHER PUBLICATIONS

U.S. Appl. No. 13/434,475, Lord et al.

(Continued)

*Primary Examiner* — Curtis Kuntz
*Assistant Examiner* — Sunita Joshi
(74) *Attorney, Agent, or Firm* — Lowe Graham Jones PLLC

(57) ABSTRACT

Techniques for sensory enhancement and augmentation are described. Some embodiments provide an audible assistance facilitator system ("AAFS") configured to provide audible assistance to a user via a hearing device. In one embodiment, the AAFS receives data that represents an utterance of a speaker received by a hearing device of the user, such as a hearing aid, smart phone, media device, or the like. The AAFS identifies the speaker based on the received data, such as by performing speaker recognition. The AAFS determines speaker-related information associated with the identified speaker, such as by determining an identifier (e.g., name or title) of the speaker, by locating an information item (e.g., an email message, document) associated with the speaker, or the like. The AAFS then informs the user of the speaker-related information, such as by causing an audio representation of the speaker-related information to be output via the hearing device.

43 Claims, 32 Drawing Sheets

(56) References Cited

U.S. PATENT DOCUMENTS

| | | |
|---|---|---|
| 6,731,202 B1 | 5/2004 | Klaus |
| 6,944,474 B2 * | 9/2005 | Rader et al. ............... 455/550.1 |
| 7,224,981 B2 * | 5/2007 | Deisher et al. ............. 455/456.1 |
| 7,324,015 B1 | 1/2008 | Allen et al. |
| 7,606,444 B1 | 10/2009 | Erol et al. |
| 7,783,022 B1 | 8/2010 | Jay et al. |
| 8,050,917 B2 | 11/2011 | Caspi et al. |
| 8,369,184 B2 | 2/2013 | Calhoun |
| 2002/0021799 A1 * | 2/2002 | Kaufholz ................ 379/406.03 |
| 2003/0158900 A1 | 8/2003 | Santos |
| 2004/0100868 A1 | 5/2004 | Patterson, Jr. et al. |
| 2004/0122678 A1 | 6/2004 | Rousseau |
| 2004/0230651 A1 | 11/2004 | Ivashin |
| 2004/0263610 A1 | 12/2004 | Whynot et al. |
| 2005/0018828 A1 | 1/2005 | Nierhaus et al. |
| 2005/0041529 A1 | 2/2005 | Schliep et al. |
| 2005/0088981 A1 | 4/2005 | Woodruff et al. |
| 2005/0135583 A1 | 6/2005 | Kardos |
| 2005/0207554 A1 | 9/2005 | Ortel |
| 2008/0061958 A1 | 3/2008 | Birk et al. |
| 2008/0195387 A1 | 8/2008 | Zigel et al. |
| 2008/0270132 A1 | 10/2008 | Navratil et al. |
| 2009/0070102 A1 | 3/2009 | Maegawa |
| 2009/0204620 A1 | 8/2009 | Thione et al. |
| 2009/0281789 A1 | 11/2009 | Waibel et al. |
| 2009/0282103 A1 | 11/2009 | Thakkar et al. |
| 2009/0306957 A1 | 12/2009 | Gao et al. |
| 2010/0040217 A1 | 2/2010 | Aberg et al. |
| 2010/0153497 A1 | 6/2010 | Sylvain et al. |
| 2010/0185434 A1 | 7/2010 | Burvall et al. |
| 2010/0222098 A1 * | 9/2010 | Garg ........................ 455/556.1 |
| 2011/0010041 A1 | 1/2011 | Wagner et al. |
| 2011/0153324 A1 | 6/2011 | Ballinger et al. |
| 2011/0184721 A1 | 7/2011 | Subramanian et al. |
| 2011/0216928 A1 | 9/2011 | Eisenberg et al. |
| 2011/0237295 A1 * | 9/2011 | Bartkowiak et al. ....... 455/556.1 |
| 2011/0270922 A1 | 11/2011 | Jones et al. |
| 2011/0307241 A1 | 12/2011 | Waibel et al. |
| 2012/0046833 A1 | 2/2012 | Sanma et al. |
| 2012/0069131 A1 | 3/2012 | Abelow |
| 2012/0072109 A1 | 3/2012 | Waite et al. |
| 2012/0075407 A1 | 3/2012 | Wessling |
| 2012/0197629 A1 | 8/2012 | Nakamura et al. |
| 2012/0323575 A1 | 12/2012 | Gibbon et al. |
| 2013/0021950 A1 | 1/2013 | Chen et al. |
| 2013/0022189 A1 | 1/2013 | Ganong, III et al. |
| 2013/0058471 A1 | 3/2013 | Garcia |
| 2013/0063542 A1 | 3/2013 | Bhat et al. |
| 2013/0103399 A1 | 4/2013 | Gammon |
| 2013/0204616 A1 | 8/2013 | Aoki et al. |

OTHER PUBLICATIONS

U.S. Appl. No. 13/425,210, Lord et al.
U.S. Appl. No. 13/407,570, Lord et al.
U.S. Appl. No. 13/397,289, Lord et al.
U.S. Appl. No. 13/362,823, Lord et al.
U.S. Appl. No. 13/356,419, Lord et al.
U.S. Appl. No. 13/340,143, Lord et al.
U.S. Appl. No. 13/324,232, Lord et al.
Menon, Arvind et al; "Roadside Range Sensors for Intersection Decision Support"; bearing a date of Apr. 1, 2004; IEEE; pp. 1-6.

* cited by examiner

Fig. 3.1
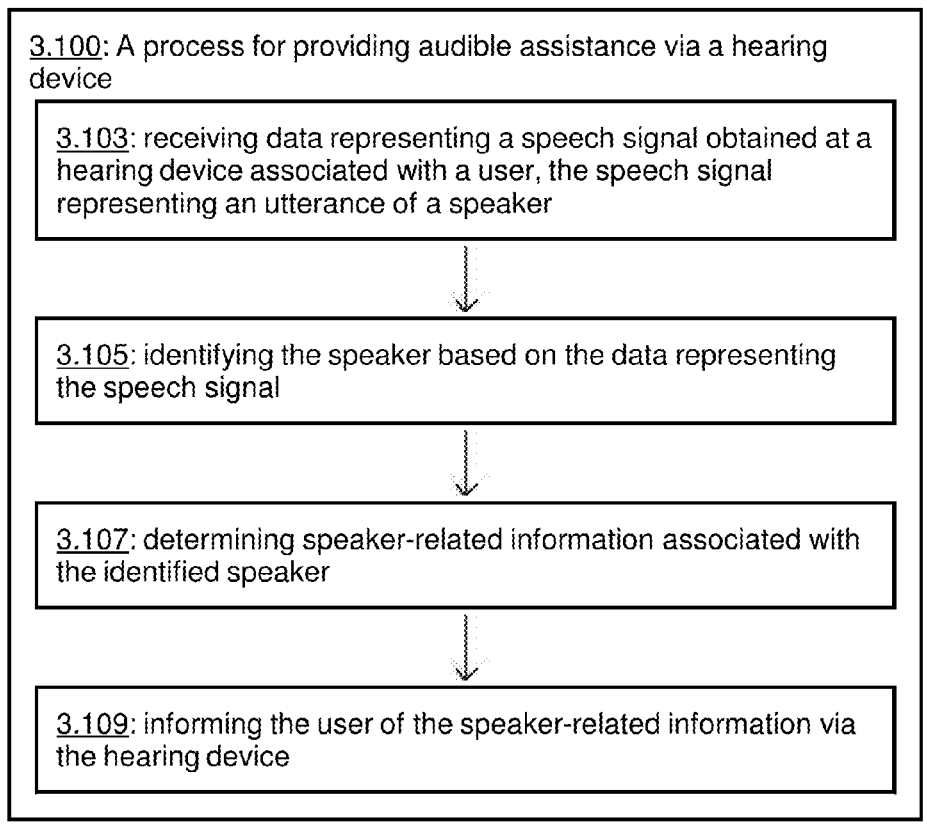
Fig. 3.2
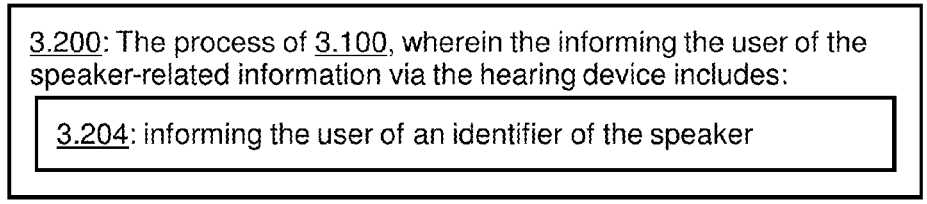

Fig. 3.3

3.300: The process of 3.100, wherein the informing the user of the speaker-related information via the hearing device includes:

> 3.304: informing the user of information aside from identifying information related to the speaker

Fig. 3.4

3.400: The process of 3.100, wherein the informing the user of the speaker-related information via the hearing device includes:

> 3.404: informing the user of an organization to which the speaker belongs

Fig. 3.5

3.500: The process of 3.400, wherein the informing the user of an organization includes:

> 3.504: informing the user of a company associated with the speaker

Fig. 3.6

3.600: The process of 3.100, wherein the informing the user of the speaker-related information via the hearing device includes:

> 3.604: informing the user of a previously transmitted communication referencing the speaker

Fig. 3.7

3.700: The process of 3.600, wherein the informing the user of a previously transmitted communication includes:

> 3.704: informing the user of an email transmitted between the speaker and the user

Fig. 3.8

3.800: The process of 3.600, wherein the informing the user of a previously transmitted communication includes:

> 3.804: informing the user of a text message transmitted between the speaker and the user

Fig. 3.9

3.900: The process of 3.100, wherein the informing the user of the speaker-related information via the hearing device includes:

> 3.904: informing the user of an event involving the user and the speaker

Fig. 3.10

3.1000: The process of 3.900, wherein the informing the user of an event includes:

> 3.1004: informing the user of a previously occurring event

Fig. 3.11

3.1100: The process of 3.900, wherein the informing the user of an event includes:

> 3.1104: informing the user of a future event

Fig. 3.12

3.1200: The process of 3.900, wherein the informing the user of an event includes:

> 3.1204: informing the user of a project

Fig. 3.13

3.1300: The process of 3.900, wherein the informing the user of an event includes:

> 3.1304: informing the user of a meeting

Fig. 3.14

3.1400: The process of 3.900, wherein the informing the user of an event includes:

> 3.1404: informing the user of a deadline

Fig. 3.15

3.1500: The process of 3.100, wherein the determining speaker-related information includes:

> 3.1504: accessing information items associated with the speaker

Fig. 3.16

3.1600: The process of 3.1500, wherein the accessing information items associated with the speaker includes:

> 3.1604: searching for information items that reference the speaker

Fig. 3.17

3.1700: The process of 3.1500, wherein the accessing information items associated with the speaker includes:

> 3.1704: searching stored emails to find emails that reference the speaker

Fig. 3.18

3.1800: The process of 3.1500, wherein the accessing information items associated with the speaker includes:

> 3.1804: searching stored text messages to find text messages that reference the speaker

Fig. 3.19

3.1900: The process of 3.1500, wherein the accessing information items associated with the speaker includes:

> 3.1904: accessing a social networking service to find messages or status updates that reference the speaker

Fig. 3.20

3.2000: The process of 3.1500, wherein the accessing information items associated with the speaker includes:

> 3.2004: accessing a calendar to find information about appointments with the speaker

Fig. 3.21

3.2100: The process of 3.1500, wherein the accessing information items associated with the speaker includes:

> 3.2104: accessing a document store to find documents that reference the speaker

Fig. 3.22

3.2200: The process of 3.100, wherein the identifying the speaker includes:

> 3.2204: performing voice identification based on the received data to identify the speaker

Fig. 3.23

3.2300: The process of 3.2200, wherein the performing voice identification includes:

> 3.2304: comparing properties of the speech signal with properties of previously recorded speech signals from multiple distinct speakers

Fig. 3.24

3.2400: The process of 3.2300, further comprising:

> 3.2404: processing voice messages from the multiple distinct speakers to generate voice print data for each of the multiple distinct speakers

Fig. 3.25

3.2500: The process of 3.2200, wherein the performing voice identification includes:

> 3.2504: processing telephone voice messages stored by a voice mail service

Fig. 3.26

3.2600: The process of 3.100, wherein the identifying the speaker includes:

> 3.2604: performing speech recognition to convert the received data into text data

> 3.2606: identifying the speaker based on the text data

Fig. 3.27

3.2700: The process of 3.2600, wherein the identifying the speaker based on the text data includes:

> 3.2704: finding a document that references the speaker and that includes one or more words in the text data

Fig. 3.28

3.2800: The process of 3.2600, wherein the performing speech recognition includes:

> 3.2804: performing speech recognition based on cepstral coefficients that represent the speech signal

Fig. 3.29

3.2900: The process of 3.2600, wherein the performing speech recognition includes:

> 3.2904: performing hidden Markov model-based speech recognition

Fig. 3.30
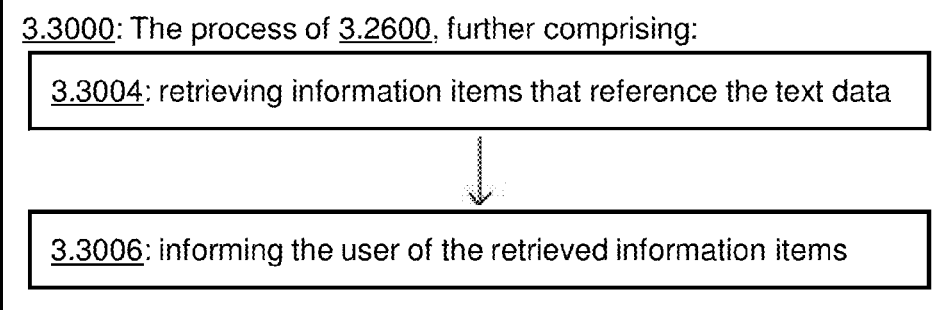
Fig. 3.31
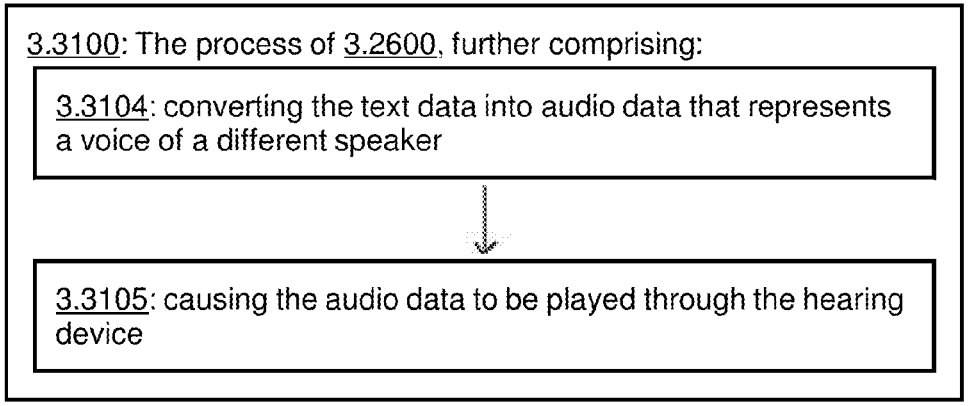

Fig. 3.32

3.3200: The process of 3.2600, wherein the performing speech recognition includes:

> 3.3204: performing speech recognition based at least in part on a language model associated with the speaker

Fig. 3.33

3.3300: The process of 3.3200, wherein the performing speech recognition based at least in part on a language model associated with the speaker includes:

> 3.3304: generating the language model based on communications generated by the speaker

Fig. 3.34

3.3400: The process of 3.3300, wherein the generating the language model based on communications generated by the speaker includes:

> 3.3404: generating the language model based on emails transmitted by the speaker

*Fig. 3.35*

3.3500: The process of 3.3300, wherein the generating the language model based on communications generated by the speaker includes:

3.3504: generating the language model based on documents authored by the speaker

*Fig. 3.36*

3.3600: The process of 3.3300, wherein the generating the language model based on communications generated by the speaker includes:

3.3604: generating the language model based on social network messages transmitted by the speaker

*Fig. 3.37*

3.3700: The process of 3.100, further comprising:

3.3704: receiving data representing a speech signal that represents an utterance of the user

3.3706: identifying the speaker based on the data representing a speech signal that represents an utterance of the user

Fig. 3.38

3.3800: The process of 3.3700, wherein the identifying the speaker based on the data representing a speech signal that represents an utterance of the user includes:

> 3.3804: determining whether the utterance of the user includes a name of the speaker

Fig. 3.39

3.3900: The process of 3.100, wherein the identifying the speaker includes:

> 3.3904: receiving context information related to the user

> 3.3906: identifying the speaker, based on the context information

Fig. 3.40

3.4000: The process of 3.3900, wherein the receiving context information related to the user includes:

3.4004: receiving an indication of a location of the user

3.4006: determining a plurality of persons with whom the user commonly interacts at the location

Fig. 3.41

3.4100: The process of 3.4000, wherein the receiving an indication of a location of the user includes:

3.4104: receiving a GPS location from a mobile device of the user

Fig. 3.42

3.4200: The process of 3.4000, wherein the receiving an indication of a location of the user includes:

3.4204: receiving a network identifier that is associated with the location

Fig. 3.43

3.4300: The process of 3.4000, wherein the receiving an indication of a location of the user includes:

> 3.4304: receiving an indication that the user is at a workplace

Fig. 3.44

3.4400: The process of 3.4000, wherein the receiving an indication of a location of the user includes:

> 3.4404: receiving an indication that the user is at a residence

Fig. 3.45

3.4500: The process of 3.3900, wherein the receiving context information related to the user includes:

> 3.4504: receiving information about a communication that references the speaker

Fig. 3.46

3.4600: The process of 3.4500, wherein the receiving information about a communication that references the speaker includes:

> 3.4604: receiving information about a message that references the speaker

Fig. 3.47

3.4700: The process of 3.4500, wherein the receiving information about a communication that references the speaker includes:

> 3.4704: receiving information about a document that references the speaker

*Fig. 3.48*
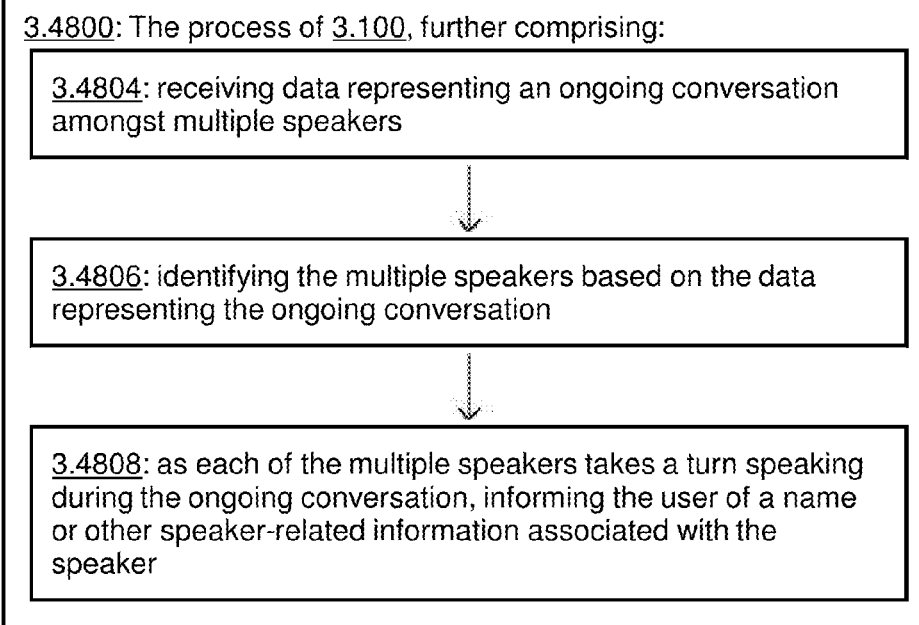
*Fig. 3.49*
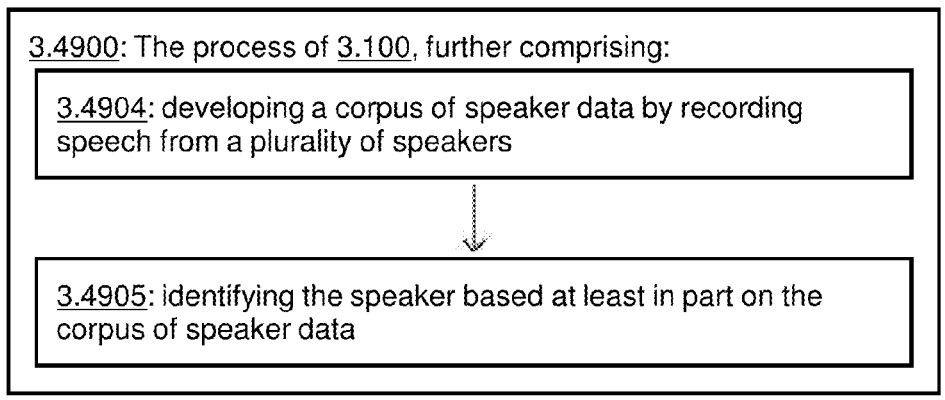

Fig. 3.50

3.5000: The process of 3.4900, further comprising:

> 3.5004: generating a speech model associated with each of the plurality of speakers, based on the recorded speech

Fig. 3.51

3.5100: The process of 3.4900, further comprising:

> 3.5104: receiving feedback regarding accuracy of the speaker-related information

> 3.5105: training a speech processor based at least in part on the received feedback

Fig. 3.52

3.5200: The process of 3.100, wherein the informing the user of the speaker-related information via the hearing device includes:

> 3.5204: transmitting the speaker-related information to a hearing device configured to amplify speech for the user

Fig. 3.53

3.5300: The process of 3.100, wherein the informing the user of the speaker-related information via the hearing device includes:

> 3.5304: transmitting the speaker-related information to the hearing device from a computing system that is remote from the hearing device

Fig. 3.54

3.5400: The process of 3.5300, wherein the transmitting the speaker-related information to the hearing device from a computing system includes:

> 3.5404: transmitting the speaker-related information from a mobile device that is operated by the user and that is in communication with the hearing device

Fig. 3.55

3.5500: The process of 3.5400, wherein the transmitting the speaker-related information from a mobile device includes:

> 3.5504: wirelessly transmitting the speaker-related information from the mobile device to the hearing device

Fig. 3.56

3.5600: The process of 3.5400, wherein the transmitting the speaker-related information from a mobile device includes:

> 3.5604: transmitting the speaker-related information from a smart phone to the hearing device

Fig. 3.57

3.5700: The process of 3.5400, wherein the transmitting the speaker-related information from a mobile device includes:

> 3.5704: transmitting the speaker-related information from a portable media player to the hearing device

Fig. 3.58

3.5800: The process of 3.5300, wherein the transmitting the speaker-related information to the hearing device from a computing system includes:

> 3.5804: transmitting the speaker-related information from a server system

Fig. 3.59

3.5900: The process of 3.5800, wherein the transmitting the speaker-related information from a server system includes:

> 3.5904: transmitting the speaker-related information from a server system that resides in a data center

Fig. 3.60

3.6000: The process of 3.100, wherein the informing the user of the speaker-related information via the hearing device includes:

> 3.6004: transmitting the speaker-related information to earphones in communication with a mobile device that is operating as the hearing device

Fig. 3.61

3.6100: The process of 3.100, wherein the informing the user of the speaker-related information via the hearing device includes:

> 3.6104: transmitting the speaker-related information to earbuds in communication with a mobile device that is operating as the hearing device

*Fig. 3.62*

3.6200: The process of 3.100, wherein the informing the user of the speaker-related information via the hearing device includes:

> 3.6204: transmitting the speaker-related information to a headset in communication with a mobile device that is operating as the hearing device

*Fig. 3.63*

3.6300: The process of 3.100, wherein the informing the user of the speaker-related information via the hearing device includes:

> 3.6304: transmitting the speaker-related information to a pillow speaker in communication with a mobile device that is operating as the hearing device

*Fig. 3.64*

3.6400: The process of 3.100, wherein the identifying the speaker includes:

> 3.6404: identifying the speaker, performed on a mobile device that is operated by the user

Fig. 3.65

3.6500: The process of 3.6400, wherein the identifying the speaker includes:

> 3.6504: identifying the speaker, performed on a smart phone that is operated by the user

Fig. 3.66

3.6600: The process of 3.6400, wherein the identifying the speaker includes:

> 3.6604: identifying the speaker, performed on a media device that is operated by the user

Fig. 3.67

3.6700: The process of 3.100, wherein the determining speaker-related information includes:

> 3.6704: determining speaker-related information, performed on a mobile device that is operated by the user

Fig. 3.68

3.6800: The process of 3.6700, wherein the determining speaker-related information includes:

> 3.6804: determining speaker-related information, performed on a smart phone that is operated by the user

Fig. 3.69

3.6900: The process of 3.6700, wherein the determining speaker-related information includes:

> 3.6904: determining speaker-related information, performed on a media device that is operated by the user

Fig. 3.70

3.7000: The process of 3.100, further comprising:

> 3.7004: determining whether or not the user can name the speaker

> 3.7006: when it is determined that the user cannot name the speaker, informing the user of the speaker-related information via the hearing device

Fig. 3.71

3.7100: The process of 3.7000, wherein the determining whether or not the user can name the speaker includes:

> 3.7104: determining whether the user has named the speaker

Fig. 3.72

3.7200: The process of 3.7100, wherein the determining whether the user has named the speaker includes:

> 3.7204: determining whether the speaker has uttered a given name or surname of the speaker

Fig. 3.73

3.7300: The process of 3.7100, wherein the determining whether the user has named the speaker includes:

> 3.7304: determining whether the speaker has uttered a nickname of the speaker

Fig. 3.74

3.7400: The process of 3.7100, wherein the determining whether the user has named the speaker includes:

> 3.7404: determining whether the speaker has uttered a name of a relationship between the user and the speaker

Fig. 3.75

3.7500: The process of 3.7000, wherein the determining whether or not the user can name the speaker includes:

> 3.7504: determining whether the user has uttered information that is related to both the speaker and the user

Fig. 3.76

3.7600: The process of 3.7100, wherein the determining whether the user has named the speaker includes:

> 3.7604: determining whether the user has named a person, place, thing, or event that the speaker and the user have in common

Fig. 3.77

3.7700: The process of 3.7000, wherein the determining whether or not the user can name the speaker includes:

3.7704: performing speech recognition to convert an utterance of the user into text data

3.7705: determining whether or not the user can name the speaker based at least in part on the text data

Fig. 3.78

3.7800: The process of 3.7000, wherein the determining whether or not the user can name the speaker includes:

3.7804: when the user does not name the speaker within a predetermined time interval, determining that the user cannot name the speaker

AUDIBLE ASSISTANCE

TECHNICAL FIELD

The present disclosure relates to methods, techniques, and systems for sensory augmentation and, more particularly, to methods, techniques, and systems for providing audible assistance to a user via a hearing device.

BRIEF DESCRIPTION OF THE DRAWINGS

FIGS. 3.1-3.78 are example flow diagrams of audible assistance processes performed by example embodiments.

DETAILED DESCRIPTION

Embodiments described herein provide enhanced computer- and network-based methods and systems for sensory augmentation and, more particularly, providing audible assistance to a user via a hearing device. Example embodiments provide an Audible Assistance Facilitator System ("AAFS"). The AAFS may augment, enhance, or improve the senses (e.g., hearing) and other faculties (e.g., memory) of a user, such as by assisting a user with the recall of names, events, communications, documents, or other information related to a speaker with whom the user is conversing. For example, when the user engages a speaker in conversation, the AAFS may "listen" to the speaker in order to identify the speaker and/or determine other speaker-related information, such as events or communications relating to the speaker and/or the user. Then, the AAFS may inform the user of the determined information, such as by "speaking" the information into an earpiece or other audio output device. The user can hear the information provided by the AAFS and advantageously use that information to avoid embarrassment (e.g., due to an inability to recall the speaker's name), engage in a more productive conversation (e.g., by quickly accessing information about events, deadlines, or communications related to the speaker), or the like.

In some embodiments, the AAFS is configured to receive data that represents an utterance of a speaker and that is obtained at or about a hearing device associated with a user. The AAFS may then identify the speaker based at least in part on the received data, such as by performing speaker recognition and/or speech recognition with the received data. The AAFS may then determine speaker-related information associated with the identified speaker, such as an identifier (e.g., name or title) of the speaker, an information item (e.g., a document, event, communication) that references the speaker, or the like. Then, the AAFS may inform the user of the determined speaker-related information by, for example, outputting audio (e.g., via text-to-speech processing) of the speaker-related information via the hearing device.

1. Audible Assistance Facilitator System Overview

Figure 1A:
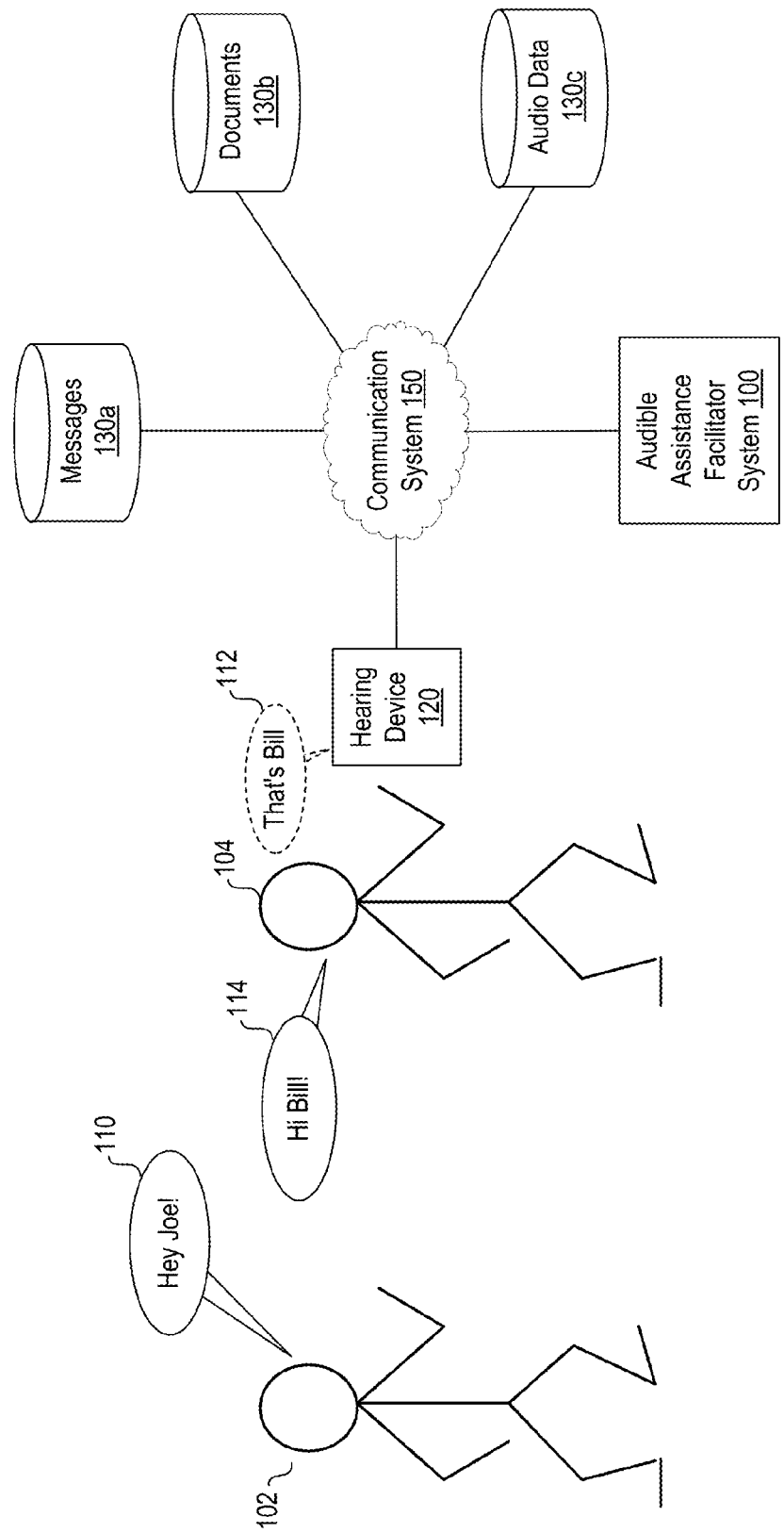
FIG. 1A is an example block diagram of an audible assistance facilitator system according to an example embodiment.

FIG. 1A is an example block diagram of an audible assistance facilitator system according to an example embodiment. In particular, FIG. 1A shows a user 104 who is engaging in a conversation with a speaker 102. The user 102 is being assisted, via a hearing device 120, by an Audible Assistance Facilitator System ("AAFS") 100. The AAFS 100 and the hearing device 120 are communicatively coupled to one another via a communication system 150. The AAFS 100 is also communicatively coupled to speaker-related information sources 130, including a messages 130a, documents 130b, and audio data 130c. The AAFS 100 uses the information in the information sources 130, in conjunction with data received from the hearing device 120, to determine speaker-related information associated with the speaker 102.

In the scenario illustrated in FIG. 1A, the conversation between the speaker 102 and the user 104 is in its initial moments. The speaker 102 has recognized the user 104 and makes an utterance 110 by speaking the words "Hey Joe!" The user 104, however, either does not recognize the speaker 102 or cannot recall his name. As will be discussed further below, the AAFS 100, in concert with the hearing device 120, will notify the user 104 of the identity of the speaker 102, so that the user 104 may avoid the potential embarrassment of not knowing the speaker's name.

The hearing device 120 receives a speech signal that represents the utterance 110, such as by receiving a digital representation of an audio signal received by a microphone of the hearing device 120. The hearing device 120 then transmits data representing the speech signal to the AAFS 100. Transmitting the data representing the speech signal may include transmitting audio samples (e.g., raw audio data), compressed audio data, speech vectors (e.g., mel frequency cepstral coefficients), and/or any other data that may be used to represent an audio signal.

The AAFS 100 then identifies the speaker based on the received data representing the speech signal. In some embodiments, identifying the speaker may include performing speaker recognition, such as by generating a "voice print" from the received data and comparing the generated voice print to previously obtained voice prints. For example, the generated voice print may be compared to multiple voice prints that are stored as audio data 130c and that each correspond to a speaker, in order to determine a speaker who has a voice that most closely matches the voice of the speaker 102. The voice prints stored as audio data 130c may be generated based on various sources of data, including data corresponding to speakers previously identified by the AAFS 100, voice mail messages, speaker enrollment data, or the like.

In some embodiments, identifying the speaker may include performing speech recognition, such as by automatically converting the received data representing the speech signal into text. The text of the speaker's utterance may then be used to identify the speaker. In particular, the text may identify one or more entities such as information items (e.g., communications, documents), events (e.g., meetings, deadlines), persons, or the like, that may be used by the AAFS 100 to identify the speaker. The information items may be accessed with reference to the messages 130a and/or documents 130b. As one example, the speaker's utterance 110 may identify an email message that was sent only to the speaker 102 and the user 104 (e.g., "That sure was a nasty email Bob sent us"). As another example, the speaker's utterance 110 may identify a meeting or other event to which both the speaker 102 and the user 104 are invited.

Note that in some cases, the text of the speaker's utterance 110 may not definitively identify the speaker 102, such as because a communication was sent to a recipients in addition to the speaker 102 and the user 104. However, in such cases the text may still be used by the AAFS 100 to narrow the set of potential speakers, and may be combined with (or used to improve) other techniques for speaker identification, including speaker recognition as discussed above.

The AAFS 100 then determines speaker-related information associated with the speaker 102. The speaker-related information may be a name or other identifier of the speaker. The speaker-related information may also or instead be other information about or related to the speaker, such as an organization of the speaker, an information item that references the speaker, an event involving the speaker, or the like. The speaker-related information may be determined with reference to the messages 130a, documents 130b, and/or audio data 130c. For example, having determined the identity of the speaker 102, the AAFS 100 may search for emails and/or documents that are stored as messages 130a and/or documents 103b and that reference (e.g., are sent to, are authored by, are named in) the speaker 102. Other types of speaker-related information is contemplated, including social networking information, such as personal or professional relationship graphs represented by a social networking service, messages or status updates sent within a social network, or the like. Social networking information may also be derived from other sources, including email lists, contact lists, communication patterns (e.g., frequent recipients of emails), or the like.

The AAFS 100 then informs the user 104 of the determined speaker-related information via the hearing device 120. Informing the user may include "speaking" the information, such as by converting textual information into audio via text-to-speech processing (e.g., speech synthesis), and then presenting the audio via a speaker (e.g., earphone, earpiece, earbud) of the hearing device 120. In the illustrated scenario, the AAFS 100 causes the hearing device 120 to make an utterance 112 by playing audio of the words "That's Bill" via a speaker (not shown) of the hearing device 120. Once the user 104 hears the utterance 112 from the hearing device 120, the user 104 responds to the speaker's original utterance 110 by with a response utterance 114 by speaking the words "Hi Bill!" As the speaker 102 and the user 104 continue to speak, the AAFS 100 may monitor the conversation and continue to determine and present speaker-related information to the user 102.

Figure 1B:
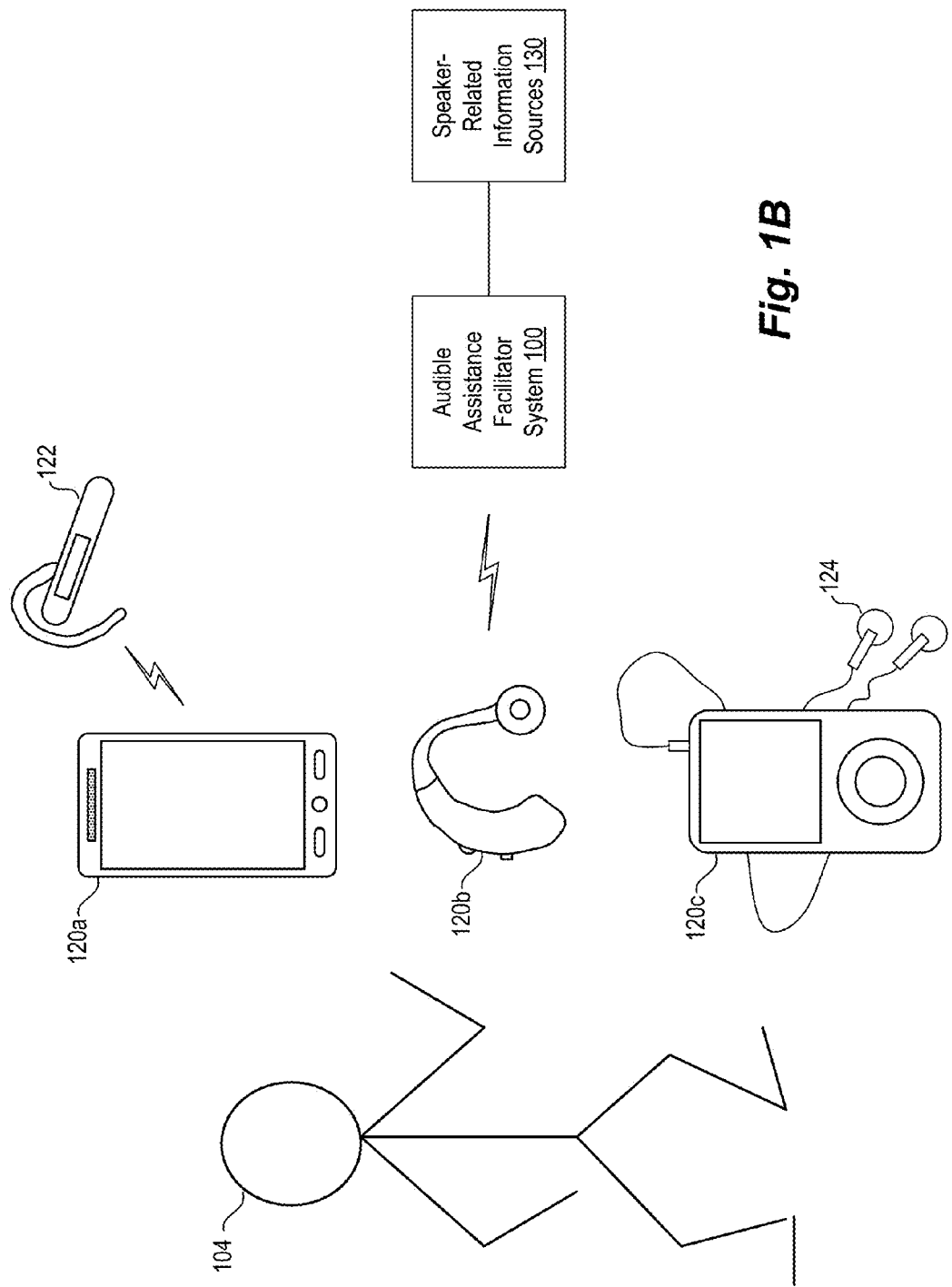
FIG. 1B is an example block diagram illustrating various hearing devices according to example embodiments.

FIG. 1B is an example block diagram illustrating various hearing devices according to example embodiments. In particular, FIG. 1B illustrates an AAFS 100 in wireless communication with example hearing devices 120a-120c. Hearing device 120a is a smart phone in communication with a wireless (e.g., Bluetooth) earpiece 122. Hearing device 120b is a hearing aid device. Hearing device 120c is a personal media player with attached "earbud" earphones.

Each of the illustrated hearing devices 120 includes or may be communicatively coupled to a microphone operable to receive a speech signal from a speaker. As described above, the hearing device 120 may then convert the speech signal into data representing the speech signal, and then forward the data to the AAFS 100.

Each of the illustrated hearing devices 120 includes or may be communicatively coupled to a speaker operable to generate and output audio signals that may be perceived by the user 104. As described above, the AAFS 100 may present information to the user 104 via the hearing device 120, for example by converting a textual representation of a name or other speaker-related information into an audio representation, and then causing that audio representation to be output via a speaker of the hearing device 120.

Note that although the AAFS 100 is shown as being separate from a hearing device 120, some or all of the functions of the AAFS 100 may be performed within or by the hearing device 120 itself. For example, the smart phone hearing device 120a and/or the media device hearing device 120c may have sufficient processing power to perform all or some functions of the AAFS 100, including speaker identification (e.g., speaker recognition, speech recognition), determining speaker-related information, presenting the determined information (e.g., by way of text-to-speech processing), or the like. In some embodiments, the hearing device 120 includes logic to determine where to perform various processing tasks, so as to advantageously distribute processing between available resources, including that of the hearing device 120, other nearby devices (e.g., a laptop or other computing device of the user 104 and/or the speaker 102), remote devices (e.g., "cloud-based" processing and/or storage), and the like.

Other types of hearing devices are contemplated. For example, a land-line telephone may be configured to operate as a hearing device, so that the AAFS 100 can identify speakers who are engaged in a conference call. As another example, a hearing device may be or be part of a desktop computer, laptop computer, PDA, tablet computer, or the like.

Figure 2:
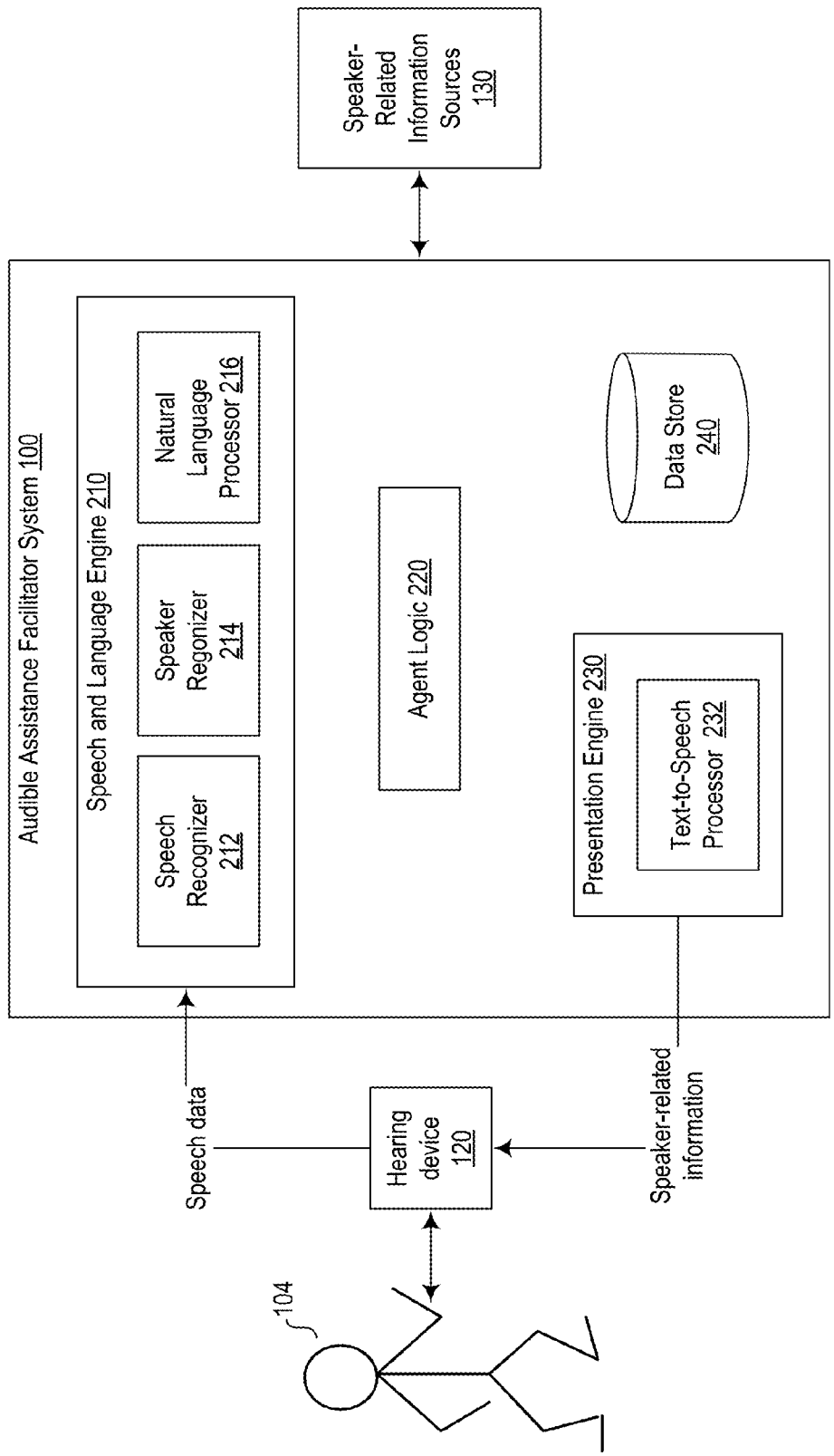
FIG. 2 is an example functional block diagram of an example audible assistance facilitator system according to an example embodiment.

FIG. 2 is an example functional block diagram of an example audible assistance facilitator system according to an example embodiment. In the illustrated embodiment of FIG. 2, the AAFS 100 includes a speech and language engine 210, agent logic 220, a presentation engine 230, and a data store 240.

The speech and language engine 210 includes a speech recognizer 212, a speaker recognizer 214, and a natural language processor 216. The speech recognizer 212 transforms speech audio data received from the hearing device 120 into textual representation of an utterance represented by the speech audio data. In some embodiments, the performance of the speech recognizer 212 may be improved or augmented by use of a language model (e.g., representing likelihoods of transitions between words, such as based on n-grams) or speech model (e.g., representing acoustic properties of a speaker's voice) that is tailored to or based on an identified speaker. For example, once a speaker has been identified, the speech recognizer 212 may use a language model that was previously generated based on a corpus of communications and other information items authored by the identified speaker. A speaker-specific language model may be generated based on a corpus of documents and/or messages authored by a speaker. Speaker-specific speech models may be used to account for accents or channel properties (e.g., due to environmental factors or communication equipment) that are specific to a particular speaker, and may be generated based on a corpus of recorded speech from the speaker.

The speaker recognizer 214 identifies the speaker based on acoustic properties of the speaker's voice, as reflected by the speech data received from the hearing device 120. The speaker recognizer 214 may compare a speaker voice print to previously generated and recorded voice prints stored in the data store 240 in order to find a best or likely match. Voice prints or other signal properties may be determined with reference to voice mail messages, voice chat data, or some other corpus of speech data.

The natural language processor 216 processes text generated by the speech recognizer 212 and/or located in information items obtained from the speaker-related information sources 130. In doing so, the natural language processor 216 may identify relationships, events, or entities (e.g., people, places, things) that may facilitate speaker identification and/or other functions of the AAFS 100. For example, the natural language processor 216 may process status updates posted by the user 104 on a social networking service, to determine that the user 104 recently attended a conference in a particular city, and this fact may be used to identify a speaker and/or determine other speaker-related information.

The agent logic 220 implements the core intelligence of the AAFS 100. The agent logic 220 may include a reasoning engine (e.g., a rules engine, decision trees, Bayesian inference engine) that combines information from multiple sources to identify speakers and/or determine speaker-related information. For example, the agent logic 220 may combine spoken text from the speech recognizer 212, a set of potentially matching speakers from the speaker recognizer 214, and information items from the information sources 130, in order to determine the most likely identity of the current speaker.

The presentation engine 230 includes a text-to-speech processor 232. The agent logic 220 may use or invoke the text-to-speech processor 232 in order to convert textual speaker-related information into audio output suitable for presentation via the hearing device 120.

Note that although speaker identification is herein sometimes described as including the positive identification of a single speaker, it may instead or also include determining likelihoods that each of one or more persons is the current speaker. For example, the speaker recognizer 214 may provide to the agent logic 220 indications of multiple candidate speakers, each having a corresponding likelihood. The agent logic 220 may then select the most likely candidate based on the likelihoods alone or in combination with other information, such as that provided by the speech recognizer 212, natural language processor 216, speaker-related information sources 130, or the like. In some cases, such as when there are a small number of reasonably likely candidate speakers, the agent logic 220 may inform the user 104 of the identities all of the candidate speakers (as opposed to a single speaker) candidate speaker, as such information may be sufficient to trigger the user's recall.

2. Example Processes

FIGS. 3.1-3.78 are example flow diagrams of audible assistance processes performed by example embodiments.

FIG. 3.1 is an example flow diagram of example logic for providing audible assistance via a hearing device. The illustrated logic may be performed, for example, by a hearing device 120 and/or one or more components of the AAFS 100 described with respect to FIG. 2. More particularly, FIG. 3.1 illustrates a process 3.100 that includes operations performed by or at the following block(s).

At block 3.103, the process performs receiving data representing a speech signal obtained at a hearing device associated with a user, the speech signal representing an utterance of a speaker.

At block 3.105, the process performs identifying the speaker based on the data representing the speech signal.

At block 3.107, the process performs determining speaker-related information associated with the identified speaker.

At block 3.109, the process performs informing the user of the speaker-related information via the hearing device.

FIG. 3.2 is an example flow diagram of example logic illustrating an example embodiment of process 3.100 of FIG. 3.1. The illustrated logic may be performed, for example, by a hearing device 120 and/or one or more components of the AAFS 100 described with respect to FIG. 2. More particularly, FIG. 3.2 illustrates a process 3.200 that includes the process 3.100, wherein the informing the user of the speaker-related information via the hearing device includes operations performed by or at the following block(s).

At block 3.204, the process performs informing the user of an identifier of the speaker. In some embodiments, the identifier of the speaker may be or include a given name, surname (e.g., last name, family name), nickname, title, job description, or other type of identifier of or associated with the speaker.

FIG. 3.3 is an example flow diagram of example logic illustrating an example embodiment of process 3.100 of FIG. 3.1. The illustrated logic may be performed, for example, by a hearing device 120 and/or one or more components of the AAFS 100 described with respect to FIG. 2. More particularly, FIG. 3.3 illustrates a process 3.300 that includes the process 3.100, wherein the informing the user of the speaker-related information via the hearing device includes operations performed by or at the following block(s).

At block 3.304, the process performs informing the user of information aside from identifying information related to the speaker. In some embodiments, information aside from identifying information may include information that is not a name or other identifier (e.g., job title) associated with the speaker. For example, the process may tell the user about an event or communication associated with or related to the speaker.

FIG. 3.4 is an example flow diagram of example logic illustrating an example embodiment of process 3.100 of FIG. 3.1. The illustrated logic may be performed, for example, by a hearing device 120 and/or one or more components of the AAFS 100 described with respect to FIG. 2. More particularly, FIG. 3.4 illustrates a process 3.400 that includes the process 3.100, wherein the informing the user of the speaker-related information via the hearing device includes operations performed by or at the following block(s).

At block 3.404, the process performs informing the user of an organization to which the speaker belongs. In some embodiments, informing the user of an organization may include notifying the user of a business, group, school, club, team, company, or other formal or informal organization with which the speaker is affiliated.

FIG. 3.5 is an example flow diagram of example logic illustrating an example embodiment of process 3.400 of FIG. 3.4. The illustrated logic may be performed, for example, by a hearing device 120 and/or one or more components of the AAFS 100 described with respect to FIG. 2. More particularly, FIG. 3.5 illustrates a process 3.500 that includes the process 3.400, wherein the informing the user of an organization includes operations performed by or at the following block(s).

At block 3.504, the process performs informing the user of a company associated with the speaker. Companies may include profit or non-profit entities, regardless of organizational structure (e.g., corporation, partnerships, sole proprietorship).

FIG. 3.6 is an example flow diagram of example logic illustrating an example embodiment of process 3.100 of FIG. 3.1. The illustrated logic may be performed, for example, by a hearing device 120 and/or one or more components of the AAFS 100 described with respect to FIG. 2. More particularly, FIG. 3.6 illustrates a process 3.600 that includes the process 3.100, wherein the informing the user of the speaker-related information via the hearing device includes operations performed by or at the following block(s).

At block 3.604, the process performs informing the user of a previously transmitted communication referencing the speaker. Various forms of communication are contemplated, including textual (e.g., emails, text messages, chats), audio (e.g., voice messages), video, or the like. In some embodiments, a communication can include content in multiple forms, such as text and audio, such as when an email includes a voice attachment.

FIG. 3.7 is an example flow diagram of example logic illustrating an example embodiment of process 3.600 of FIG. 3.6. The illustrated logic may be performed, for example, by a hearing device 120 and/or one or more components of the AAFS 100 described with respect to FIG. 2. More particularly, FIG. 3.7 illustrates a process 3.700 that includes the process 3.600, wherein the informing the user of a previously transmitted communication includes operations performed by or at the following block(s).

At block 3.704, the process performs informing the user of an email transmitted between the speaker and the user. An email transmitted between the speaker and the user may include an email sent from the speaker to the user, or vice versa.

FIG. 3.8 is an example flow diagram of example logic illustrating an example embodiment of process 3.600 of FIG. 3.6. The illustrated logic may be performed, for example, by a hearing device 120 and/or one or more components of the AAFS 100 described with respect to FIG. 2. More particularly, FIG. 3.8 illustrates a process 3.800 that includes the process 3.600, wherein the informing the user of a previously transmitted communication includes operations performed by or at the following block(s).

At block 3.804, the process performs informing the user of a text message transmitted between the speaker and the user. Text messages may include short messages according to various protocols, including SMS, MMS, and the like.

FIG. 3.9 is an example flow diagram of example logic illustrating an example embodiment of process 3.100 of FIG. 3.1. The illustrated logic may be performed, for example, by a hearing device 120 and/or one or more components of the AAFS 100 described with respect to FIG. 2. More particularly, FIG. 3.9 illustrates a process 3.900 that includes the process 3.100, wherein the informing the user of the speaker-related information via the hearing device includes operations performed by or at the following block(s).

At block 3.904, the process performs informing the user of an event involving the user and the speaker. An event may be any occurrence that involves or involved the user and the speaker, such as a meeting (e.g., social or professional meeting or gathering) attended by the user and the speaker, an upcoming deadline (e.g., for a project), or the like.

FIG. 3.10 is an example flow diagram of example logic illustrating an example embodiment of process 3.900 of FIG. 3.9. The illustrated logic may be performed, for example, by a hearing device 120 and/or one or more components of the AAFS 100 described with respect to FIG. 2. More particularly, FIG. 3.10 illustrates a process 3.1000 that includes the process 3.900, wherein the informing the user of an event includes operations performed by or at the following block(s).

At block 3.1004, the process performs informing the user of a previously occurring event.

FIG. 3.11 is an example flow diagram of example logic illustrating an example embodiment of process 3.900 of FIG. 3.9. The illustrated logic may be performed, for example, by a hearing device 120 and/or one or more components of the AAFS 100 described with respect to FIG. 2. More particularly, FIG. 3.11 illustrates a process 3.1100 that includes the process 3.900, wherein the informing the user of an event includes operations performed by or at the following block(s).

At block 3.1104, the process performs informing the user of a future event.

FIG. 3.12 is an example flow diagram of example logic illustrating an example embodiment of process 3.900 of FIG. 3.9. The illustrated logic may be performed, for example, by a hearing device 120 and/or one or more components of the AAFS 100 described with respect to FIG. 2. More particularly, FIG. 3.12 illustrates a process 3.1200 that includes the process 3.900, wherein the informing the user of an event includes operations performed by or at the following block(s).

At block 3.1204, the process performs informing the user of a project.

FIG. 3.13 is an example flow diagram of example logic illustrating an example embodiment of process 3.900 of FIG. 3.9. The illustrated logic may be performed, for example, by a hearing device 120 and/or one or more components of the AAFS 100 described with respect to FIG. 2. More particularly, FIG. 3.13 illustrates a process 3.1300 that includes the process 3.900, wherein the informing the user of an event includes operations performed by or at the following block(s).

At block 3.1304, the process performs informing the user of a meeting.

FIG. 3.14 is an example flow diagram of example logic illustrating an example embodiment of process 3.900 of FIG. 3.9. The illustrated logic may be performed, for example, by a hearing device 120 and/or one or more components of the AAFS 100 described with respect to FIG. 2. More particularly, FIG. 3.14 illustrates a process 3.1400 that includes the process 3.900, wherein the informing the user of an event includes operations performed by or at the following block(s).

At block 3.1404, the process performs informing the user of a deadline.

FIG. 3.15 is an example flow diagram of example logic illustrating an example embodiment of process 3.100 of FIG. 3.1. The illustrated logic may be performed, for example, by a hearing device 120 and/or one or more components of the AAFS 100 described with respect to FIG. 2. More particularly, FIG. 3.15 illustrates a process 3.1500 that includes the process 3.100, wherein the determining speaker-related information includes operations performed by or at the following block(s).

At block 3.1504, the process performs accessing information items associated with the speaker. In some embodiments, accessing information items associated with the speaker may include retrieving files, documents, data records, or the like from various sources, such as local or remote storage devices, including cloud-based servers, and the like. In some embodiments, accessing information items may also or instead include scanning, searching, indexing, or otherwise processing information items to find ones that include, name, mention, or otherwise reference the speaker.

FIG. 3.16 is an example flow diagram of example logic illustrating an example embodiment of process 3.1500 of FIG. 3.15. The illustrated logic may be performed, for example, by a hearing device 120 and/or one or more components of the AAFS 100 described with respect to FIG. 2. More particularly, FIG. 3.16 illustrates a process 3.1600 that includes the process 3.1500, wherein the accessing information items associated with the speaker includes operations performed by or at the following block(s).

At block 3.1604, the process performs searching for information items that reference the speaker. In some embodiments, searching may include formulating a search query to provide to a document management system or any other data/document store that provides a search interface.

FIG. 3.17 is an example flow diagram of example logic illustrating an example embodiment of process 3.1500 of FIG. 3.15. The illustrated logic may be performed, for example, by a hearing device 120 and/or one or more components of the AAFS 100 described with respect to FIG. 2. More particularly, FIG. 3.17 illustrates a process 3.1700 that includes the process 3.1500, wherein the accessing information items associated with the speaker includes operations performed by or at the following block(s).

At block 3.1704, the process performs searching stored emails to find emails that reference the speaker. In some embodiments, emails that reference the speaker may include emails sent from the speaker, emails sent to the speaker, emails that name or otherwise identify the speaker in the body of an email, or the like.

FIG. 3.18 is an example flow diagram of example logic illustrating an example embodiment of process 3.1500 of FIG. 3.15. The illustrated logic may be performed, for example, by a hearing device 120 and/or one or more components of the AAFS 100 described with respect to FIG. 2. More particularly, FIG. 3.18 illustrates a process 3.1800 that includes the process 3.1500, wherein the accessing information items associated with the speaker includes operations performed by or at the following block(s).

At block 3.1804, the process performs searching stored text messages to find text messages that reference the speaker. In some embodiments, text messages that reference the speaker include messages sent to/from the speaker, messages that name or otherwise identify the speaker in a message body, or the like.

FIG. 3.19 is an example flow diagram of example logic illustrating an example embodiment of process 3.1500 of FIG. 3.15. The illustrated logic may be performed, for example, by a hearing device 120 and/or one or more components of the AAFS 100 described with respect to FIG. 2. More particularly, FIG. 3.19 illustrates a process 3.1900 that includes the process 3.1500, wherein the accessing information items associated with the speaker includes operations performed by or at the following block(s).

At block 3.1904, the process performs accessing a social networking service to find messages or status updates that reference the speaker. In some embodiments, accessing a social networking service may include searching for postings, status updates, personal messages, or the like that have been posted by, posted to, or otherwise reference the speaker. Example social networking services include Facebook, Twitter, Google Plus, and the like. Access to a social networking service may be obtained via an API or similar interface that provides access to social networking data related to the user and/or the speaker.

FIG. 3.20 is an example flow diagram of example logic illustrating an example embodiment of process 3.1500 of FIG. 3.15. The illustrated logic may be performed, for example, by a hearing device 120 and/or one or more components of the AAFS 100 described with respect to FIG. 2. More particularly, FIG. 3.20 illustrates a process 3.2000 that includes the process 3.1500, wherein the accessing information items associated with the speaker includes operations performed by or at the following block(s).

At block 3.2004, the process performs accessing a calendar to find information about appointments with the speaker. In some embodiments, accessing a calendar may include searching a private or shared calendar to locate a meeting or other appointment with the speaker, and providing such information to the user via the hearing device.

FIG. 3.21 is an example flow diagram of example logic illustrating an example embodiment of process 3.1500 of FIG. 3.15. The illustrated logic may be performed, for example, by a hearing device 120 and/or one or more components of the AAFS 100 described with respect to FIG. 2. More particularly, FIG. 3.21 illustrates a process 3.2100 that includes the process 3.1500, wherein the accessing information items associated with the speaker includes operations performed by or at the following block(s).

At block 3.2104, the process performs accessing a document store to find documents that reference the speaker. In some embodiments, documents that reference the speaker include those that are authored at least in part by the speaker, those that name or otherwise identify the speaker in a document body, or the like. Accessing the document store may include accessing a local or remote storage device/system, accessing a document management system, accessing a source control system, or the like.

FIG. 3.22 is an example flow diagram of example logic illustrating an example embodiment of process 3.100 of FIG. 3.1. The illustrated logic may be performed, for example, by a hearing device 120 and/or one or more components of the AAFS 100 described with respect to FIG. 2. More particularly, FIG. 3.22 illustrates a process 3.2200 that includes the process 3.100, wherein the identifying the speaker includes operations performed by or at the following block(s).

At block 3.2204, the process performs performing voice identification based on the received data to identify the speaker. In some embodiments, voice identification may include generating a voice print, voice model, or other biometric feature set that characterizes the voice of the speaker, and then comparing the generated voice print to previously generated voice prints.

FIG. 3.23 is an example flow diagram of example logic illustrating an example embodiment of process 3.2200 of FIG. 3.22. The illustrated logic may be performed, for example, by a hearing device 120 and/or one or more components of the AAFS 100 described with respect to FIG. 2. More particularly, FIG. 3.23 illustrates a process 3.2300 that includes the process 3.2200, wherein the performing voice identification includes operations performed by or at the following block(s).

At block 3.2304, the process performs comparing properties of the speech signal with properties of previously recorded speech signals from multiple distinct speakers. In some embodiments, the process accesses voice prints associated with multiple speakers, and determines a best match against the speech signal.

FIG. 3.24 is an example flow diagram of example logic illustrating an example embodiment of process 3.2300 of FIG. 3.23. The illustrated logic may be performed, for example, by a hearing device 120 and/or one or more components of the AAFS 100 described with respect to FIG. 2. More particularly, FIG. 3.24 illustrates a process 3.2400 that includes the process 3.2300 and which further includes operations performed by or at the following blocks.

At block 3.2404, the process performs processing voice messages from the multiple distinct speakers to generate voice print data for each of the multiple distinct speakers. Given a telephone voice message, the process may associate generated voice print data for the voice message with one or more (direct or indirect) identifiers corresponding with the message. For example, the message may have a sender telephone number associated with it, and the process can use that sender telephone number to do a reverse directory lookup (e.g., in a public directory, in a personal contact list) to determine the name of the voice message speaker.

FIG. 3.25 is an example flow diagram of example logic illustrating an example embodiment of process 3.2200 of FIG. 3.22. The illustrated logic may be performed, for example, by a hearing device 120 and/or one or more components of the AAFS 100 described with respect to FIG. 2. More particularly, FIG. 3.25 illustrates a process 3.2500 that includes the process 3.2200, wherein the performing voice identification includes operations performed by or at the following block(s).

At block 3.2504, the process performs processing telephone voice messages stored by a voice mail service. In some embodiments, the process analyzes voice messages to generate voice prints/models for multiple speakers.

FIG. 3.26 is an example flow diagram of example logic illustrating an example embodiment of process 3.100 of FIG. 3.1. The illustrated logic may be performed, for example, by a hearing device 120 and/or one or more components of the AAFS 100 described with respect to FIG. 2. More particularly, FIG. 3.26 illustrates a process 3.2600 that includes the process 3.100, wherein the identifying the speaker includes operations performed by or at the following block(s).

At block 3.2604, the process performs performing speech recognition to convert the received data into text data. For example, the process may convert the received data into a sequence of words that are (or are likely to be) the words uttered by the speaker.

At block 3.2606, the process performs identifying the speaker based on the text data. Given text data (e.g., words spoken by the speaker), the process may search for information items that include the text data, and then identify the speaker based on those information items, as discussed further below.

FIG. 3.27 is an example flow diagram of example logic illustrating an example embodiment of process 3.2600 of FIG. 3.26. The illustrated logic may be performed, for example, by a hearing device 120 and/or one or more components of the AAFS 100 described with respect to FIG. 2. More particularly, FIG. 3.27 illustrates a process 3.2700 that includes the process 3.2600, wherein the identifying the speaker based on the text data includes operations performed by or at the following block(s).

At block 3.2704, the process performs finding a document that references the speaker and that includes one or more words in the text data. In some embodiments, the process may search for and find a document or other item that includes words spoken by speaker. Then, the process can infer that the speaker is the author of the document, a recipient of the document, a person described in the document, or the like.

FIG. 3.28 is an example flow diagram of example logic illustrating an example embodiment of process 3.2600 of FIG. 3.26. The illustrated logic may be performed, for example, by a hearing device 120 and/or one or more components of the AAFS 100 described with respect to FIG. 2. More particularly, FIG. 3.28 illustrates a process 3.2800 that includes the process 3.2600, wherein the performing speech recognition includes operations performed by or at the following block(s).

At block 3.2804, the process performs performing speech recognition based on cepstral coefficients that represent the speech signal. In other embodiments, other types of features or information may be also or instead used to perform speech recognition, including language models, dialect models, or the like.

FIG. 3.29 is an example flow diagram of example logic illustrating an example embodiment of process 3.2600 of FIG. 3.26. The illustrated logic may be performed, for example, by a hearing device 120 and/or one or more components of the AAFS 100 described with respect to FIG. 2. More particularly, FIG. 3.29 illustrates a process 3.2900 that includes the process 3.2600, wherein the performing speech recognition includes operations performed by or at the following block(s).

At block 3.2904, the process performs performing hidden Markov model-based speech recognition. Other approaches or techniques for speech recognition may include neural networks, stochastic modeling, or the like.

FIG. 3.30 is an example flow diagram of example logic illustrating an example embodiment of process 3.2600 of FIG. 3.26. The illustrated logic may be performed, for example, by a hearing device 120 and/or one or more components of the AAFS 100 described with respect to FIG. 2. More particularly, FIG. 3.30 illustrates a process 3.3000 that includes the process 3.2600 and which further includes operations performed by or at the following blocks.

At block 3.3004, the process performs retrieving information items that reference the text data. The process may here retrieve or otherwise obtain documents, calendar events, messages, or the like, that include, contain, or otherwise reference some portion of the text data.

At block 3.3006, the process performs informing the user of the retrieved information items.

FIG. 3.31 is an example flow diagram of example logic illustrating an example embodiment of process 3.2600 of FIG. 3.26. The illustrated logic may be performed, for example, by a hearing device 120 and/or one or more components of the AAFS 100 described with respect to FIG. 2. More particularly, FIG. 3.31 illustrates a process 3.3100 that includes the process 3.2600 and which further includes operations performed by or at the following blocks.

At block 3.3104, the process performs converting the text data into audio data that represents a voice of a different speaker. In some embodiments, the process may perform this conversion by performing text-to-speech processing to read the text data in a different voice.

At block 3.3105, the process performs causing the audio data to be played through the hearing device.

FIG. 3.32 is an example flow diagram of example logic illustrating an example embodiment of process 3.2600 of FIG. 3.26. The illustrated logic may be performed, for example, by a hearing device 120 and/or one or more components of the AAFS 100 described with respect to FIG. 2. More particularly, FIG. 3.32 illustrates a process 3.3200 that includes the process 3.2600, wherein the performing speech recognition includes operations performed by or at the following block(s).

At block 3.3204, the process performs performing speech recognition based at least in part on a language model associated with the speaker. A language model may be used to improve or enhance speech recognition. For example, the language model may represent word transition likelihoods (e.g., by way of n-grams) that can be advantageously employed to enhance speech recognition. Furthermore, such a language model may be speaker specific, in that it may be based on communications or other information generated by the speaker.

FIG. 3.33 is an example flow diagram of example logic illustrating an example embodiment of process 3.3200 of FIG. 3.32. The illustrated logic may be performed, for example, by a hearing device 120 and/or one or more components of the AAFS 100 described with respect to FIG. 2. More particularly, FIG. 3.33 illustrates a process 3.3300 that includes the process 3.3200, wherein the performing speech recognition based at least in part on a language model associated with the speaker includes operations performed by or at the following block(s).

At block 3.3304, the process performs generating the language model based on communications generated by the speaker. In some embodiments, the process mines or otherwise processes emails, text messages, voice messages, and the like to generate a language model that is specific or otherwise tailored to the speaker.

FIG. 3.34 is an example flow diagram of example logic illustrating an example embodiment of process 3.3300 of FIG. 3.33. The illustrated logic may be performed, for example, by a hearing device 120 and/or one or more components of the AAFS 100 described with respect to FIG. 2. More particularly, FIG. 3.34 illustrates a process 3.3400 that includes the process 3.3300, wherein the generating the language model based on communications generated by the speaker includes operations performed by or at the following block(s).

At block 3.3404, the process performs generating the language model based on emails transmitted by the speaker.

FIG. 3.35 is an example flow diagram of example logic illustrating an example embodiment of process 3.3300 of FIG. 3.33. The illustrated logic may be performed, for example, by a hearing device 120 and/or one or more components of the AAFS 100 described with respect to FIG. 2. More particularly, FIG. 3.35 illustrates a process 3.3500 that includes the process 3.3300, wherein the generating the language model based on communications generated by the speaker includes operations performed by or at the following block(s).

At block 3.3504, the process performs generating the language model based on documents authored by the speaker.

FIG. 3.36 is an example flow diagram of example logic illustrating an example embodiment of process 3.3300 of FIG. 3.33. The illustrated logic may be performed, for example, by a hearing device 120 and/or one or more components of the AAFS 100 described with respect to FIG. 2. More particularly, FIG. 3.36 illustrates a process 3.3600 that includes the process 3.3300, wherein the generating the language model based on communications generated by the speaker includes operations performed by or at the following block(s).

At block 3.3604, the process performs generating the language model based on social network messages transmitted by the speaker.

FIG. 3.37 is an example flow diagram of example logic illustrating an example embodiment of process 3.100 of FIG. 3.1. The illustrated logic may be performed, for example, by a hearing device 120 and/or one or more components of the AAFS 100 described with respect to FIG. 2. More particularly, FIG. 3.37 illustrates a process 3.3700 that includes the process 3.100 and which further includes operations performed by or at the following blocks.

At block 3.3704, the process performs receiving data representing a speech signal that represents an utterance of the user. A microphone on or about the hearing device may capture this data. The microphone may be the same or different from one used to capture speech data from the speaker.

At block 3.3706, the process performs identifying the speaker based on the data representing a speech signal that represents an utterance of the user. Identifying the speaker in this manner may include performing speech recognition on the user's utterance, and then processing the resulting text data to locate a name. This identification can then be utilized to retrieve information items or other speaker-related information that may be useful to present to the user.

FIG. 3.38 is an example flow diagram of example logic illustrating an example embodiment of process 3.3700 of FIG. 3.37. The illustrated logic may be performed, for example, by a hearing device 120 and/or one or more components of the AAFS 100 described with respect to FIG. 2. More particularly, FIG. 3.38 illustrates a process 3.3800 that includes the process 3.3700, wherein the identifying the speaker based on the data representing a speech signal that represents an utterance of the user includes operations performed by or at the following block(s).

At block 3.3804, the process performs determining whether the utterance of the user includes a name of the speaker.

FIG. 3.39 is an example flow diagram of example logic illustrating an example embodiment of process 3.100 of FIG. 3.1. The illustrated logic may be performed, for example, by a hearing device 120 and/or one or more components of the AAFS 100 described with respect to FIG. 2. More particularly, FIG. 3.39 illustrates a process 3.3900 that includes the process 3.100, wherein the identifying the speaker includes operations performed by or at the following block(s).

At block 3.3904, the process performs receiving context information related to the user. Context information may generally include information about the setting, location, occupation, communication, workflow, or other event or factor that is present at, about, or with respect to the user.

At block 3.3906, the process performs identifying the speaker, based on the context information. Context information may be used to improve or enhance speaker identification, such as by determining or narrowing a set of potential speakers based on the current location of the user.

FIG. 3.40 is an example flow diagram of example logic illustrating an example embodiment of process 3.3900 of FIG. 3.39. The illustrated logic may be performed, for example, by a hearing device 120 and/or one or more components of the AAFS 100 described with respect to FIG. 2. More particularly, FIG. 3.40 illustrates a process 3.4000 that includes the process 3.3900, wherein the receiving context information related to the user includes operations performed by or at the following block(s).

At block 3.4004, the process performs receiving an indication of a location of the user.

At block 3.4006, the process performs determining a plurality of persons with whom the user commonly interacts at the location. For example, if the indicated location is a workplace, the process may generate a list of co-workers, thereby reducing or simplifying the problem of speaker identification.

FIG. 3.41 is an example flow diagram of example logic illustrating an example embodiment of process 3.4000 of FIG. 3.40. The illustrated logic may be performed, for example, by a hearing device 120 and/or one or more components of the AAFS 100 described with respect to FIG. 2. More particularly, FIG. 3.41 illustrates a process 3.4100 that includes the process 3.4000, wherein the receiving an indication of a location of the user includes operations performed by or at the following block(s).

At block 3.4104, the process performs receiving a GPS location from a mobile device of the user.

FIG. 3.42 is an example flow diagram of example logic illustrating an example embodiment of process 3.4000 of FIG. 3.40. The illustrated logic may be performed, for example, by a hearing device 120 and/or one or more components of the AAFS 100 described with respect to FIG. 2. More particularly, FIG. 3.42 illustrates a process 3.4200 that includes the process 3.4000, wherein the receiving an indication of a location of the user includes operations performed by or at the following block(s).

At block 3.4204, the process performs receiving a network identifier that is associated with the location. The network identifier may be, for example, a service set identifier ("SSID") of a wireless network with which the user is currently associated.

FIG. 3.43 is an example flow diagram of example logic illustrating an example embodiment of process 3.4000 of FIG. 3.40. The illustrated logic may be performed, for example, by a hearing device 120 and/or one or more components of the AAFS 100 described with respect to FIG. 2. More particularly, FIG. 3.43 illustrates a process 3.4300 that includes the process 3.4000, wherein the receiving an indication of a location of the user includes operations performed by or at the following block(s).

At block 3.4304, the process performs receiving an indication that the user is at a workplace. For example, the process may translate a coordinate-based location (e.g., GPS coordinates) to a particular workplace by performing a map lookup or other mechanism.

FIG. 3.44 is an example flow diagram of example logic illustrating an example embodiment of process 3.4000 of FIG. 3.40. The illustrated logic may be performed, for example, by a hearing device 120 and/or one or more components of the AAFS 100 described with respect to FIG. 2. More particularly, FIG. 3.44 illustrates a process 3.4400 that includes the process 3.4000, wherein the receiving an indication of a location of the user includes operations performed by or at the following block(s).

At block 3.4404, the process performs receiving an indication that the user is at a residence.

FIG. 3.45 is an example flow diagram of example logic illustrating an example embodiment of process 3.3900 of FIG. 3.39. The illustrated logic may be performed, for example, by a hearing device 120 and/or one or more components of the AAFS 100 described with respect to FIG. 2. More particularly, FIG. 3.45 illustrates a process 3.4500 that includes the process 3.3900, wherein the receiving context information related to the user includes operations performed by or at the following block(s).

At block 3.4504, the process performs receiving information about a communication that references the speaker. As noted, context information may include communications. In this case, the process may exploit such communications to improve speaker identification or other operations.

FIG. 3.46 is an example flow diagram of example logic illustrating an example embodiment of process 3.4500 of FIG. 3.45. The illustrated logic may be performed, for example, by a hearing device 120 and/or one or more components of the AAFS 100 described with respect to FIG. 2. More particularly, FIG. 3.46 illustrates a process 3.4600 that includes the process 3.4500, wherein the receiving information about a communication that references the speaker includes operations performed by or at the following block(s).

At block 3.4604, the process performs receiving information about a message that references the speaker.

FIG. 3.47 is an example flow diagram of example logic illustrating an example embodiment of process 3.4500 of FIG. 3.45. The illustrated logic may be performed, for example, by a hearing device 120 and/or one or more components of the AAFS 100 described with respect to FIG. 2. More particularly, FIG. 3.47 illustrates a process 3.4700 that includes the process 3.4500, wherein the receiving information about a communication that references the speaker includes operations performed by or at the following block(s).

At block 3.4704, the process performs receiving information about a document that references the speaker.

FIG. 3.48 is an example flow diagram of example logic illustrating an example embodiment of process 3.100 of FIG. 3.1. The illustrated logic may be performed, for example, by a hearing device 120 and/or one or more components of the AAFS 100 described with respect to FIG. 2. More particularly, FIG. 3.48 illustrates a process 3.4800 that includes the process 3.100 and which further includes operations performed by or at the following blocks.

At block 3.4804, the process performs receiving data representing an ongoing conversation amongst multiple speakers. In some embodiments, the process is operable to identify multiple distinct speakers, such as when a group is meeting via a conference call.

At block 3.4806, the process performs identifying the multiple speakers based on the data representing the ongoing conversation.

At block 3.4808, the process performs as each of the multiple speakers takes a turn speaking during the ongoing conversation, informing the user of a name or other speaker-related information associated with the speaker. In this manner, the process may, in substantially real time, provide the user with indications of a current speaker, even though such a speaker may not be visible or even previously known to the user.

FIG. 3.49 is an example flow diagram of example logic illustrating an example embodiment of process 3.100 of FIG. 3.1. The illustrated logic may be performed, for example, by a hearing device 120 and/or one or more components of the AAFS 100 described with respect to FIG. 2. More particularly, FIG. 3.49 illustrates a process 3.4900 that includes the process 3.100 and which further includes operations performed by or at the following blocks.

At block 3.4904, the process performs developing a corpus of speaker data by recording speech from a plurality of speakers.

At block 3.4905, the process performs identifying the speaker based at least in part on the corpus of speaker data. Over time, the process may gather and record speech obtained during its operation, and then use that speech as part of a corpus that is used during future operation. In this manner, the process may improve its performance by utilizing actual, environmental speech data, possibly along with feedback received from the user, as discussed below.

FIG. 3.50 is an example flow diagram of example logic illustrating an example embodiment of process 3.4900 of FIG. 3.49. The illustrated logic may be performed, for example, by a hearing device 120 and/or one or more components of the AAFS 100 described with respect to FIG. 2. More particularly, FIG. 3.50 illustrates a process 3.5000 that includes the process 3.4900 and which further includes operations performed by or at the following blocks.

At block 3.5004, the process performs generating a speech model associated with each of the plurality of speakers, based on the recorded speech. The generated speech model may include voice print data that can be used for speaker identification, a language model that may be used for speech recognition purposes, a noise model that may be used to improve operation in speaker-specific noisy environments.

FIG. 3.51 is an example flow diagram of example logic illustrating an example embodiment of process 3.4900 of FIG. 3.49. The illustrated logic may be performed, for example, by a hearing device 120 and/or one or more components of the AAFS 100 described with respect to FIG. 2. More particularly, FIG. 3.51 illustrates a process 3.5100 that includes the process 3.4900 and which further includes operations performed by or at the following blocks.

At block 3.5104, the process performs receiving feedback regarding accuracy of the speaker-related information. During or after providing speaker-related information to the user, the user may provide feedback regarding its accuracy. This feedback may then be used to train a speech processor (e.g., a speaker identification module, a speech recognition module). Feedback may be provided in various ways, such as by processing positive/negative utterances from the speaker (e.g., "That is not my name"), receiving a positive/negative utterance from the user (e.g., "I am sorry."), receiving a keyboard/button event that indicates a correct or incorrect identification.

At block 3.5105, the process performs training a speech processor based at least in part on the received feedback.

FIG. 3.52 is an example flow diagram of example logic illustrating an example embodiment of process 3.100 of FIG. 3.1. The illustrated logic may be performed, for example, by a hearing device 120 and/or one or more components of the AAFS 100 described with respect to FIG. 2. More particularly, FIG. 3.52 illustrates a process 3.5200 that includes the process 3.100, wherein the informing the user of the speaker-related information via the hearing device includes operations performed by or at the following block(s).

At block 3.5204, the process performs transmitting the speaker-related information to a hearing device configured to amplify speech for the user. In some embodiments, the hearing device may be a hearing aid or similar device that is configured to amplify or otherwise modulate audio signals for the user.

FIG. 3.53 is an example flow diagram of example logic illustrating an example embodiment of process 3.100 of FIG. 3.1. The illustrated logic may be performed, for example, by a hearing device 120 and/or one or more components of the AAFS 100 described with respect to FIG. 2. More particularly, FIG. 3.53 illustrates a process 3.5300 that includes the process 3.100, wherein the informing the user of the speaker-related information via the hearing device includes operations performed by or at the following block(s).

At block 3.5304, the process performs transmitting the speaker-related information to the hearing device from a computing system that is remote from the hearing device. In some embodiments, at least some of the processing performed remote from the hearing device, such that the speaker-related information is transmitted to the hearing device.

FIG. 3.54 is an example flow diagram of example logic illustrating an example embodiment of process 3.5300 of FIG. 3.53. The illustrated logic may be performed, for example, by a hearing device 120 and/or one or more components of the AAFS 100 described with respect to FIG. 2. More particularly, FIG. 3.54 illustrates a process 3.5400 that includes the process 3.5300, wherein the transmitting the speaker-related information to the hearing device from a computing system includes operations performed by or at the following block(s).

At block 3.5404, the process performs transmitting the speaker-related information from a mobile device that is operated by the user and that is in communication with the hearing device. For example, the hearing device may be a headset or earpiece that communicates with a mobile device (e.g., smart phone) operated by the user.

FIG. 3.55 is an example flow diagram of example logic illustrating an example embodiment of process 3.5400 of FIG. 3.54. The illustrated logic may be performed, for example, by a hearing device 120 and/or one or more components of the AAFS 100 described with respect to FIG. 2. More particularly, FIG. 3.55 illustrates a process 3.5500 that includes the process 3.5400, wherein the transmitting the speaker-related information from a mobile device includes operations performed by or at the following block(s).

At block 3.5504, the process performs wirelessly transmitting the speaker-related information from the mobile device to the hearing device. Various protocols may be used, including Bluetooth, infrared, WiFi, or the like.

FIG. 3.56 is an example flow diagram of example logic illustrating an example embodiment of process 3.5400 of FIG. 3.54. The illustrated logic may be performed, for example, by a hearing device 120 and/or one or more components of the AAFS 100 described with respect to FIG. 2. More particularly, FIG. 3.56 illustrates a process 3.5600 that includes the process 3.5400, wherein the transmitting the speaker-related information from a mobile device includes operations performed by or at the following block(s).

At block 3.5604, the process performs transmitting the speaker-related information from a smart phone to the hearing device.

FIG. 3.57 is an example flow diagram of example logic illustrating an example embodiment of process 3.5400 of FIG. 3.54. The illustrated logic may be performed, for example, by a hearing device 120 and/or one or more components of the AAFS 100 described with respect to FIG. 2. More particularly, FIG. 3.57 illustrates a process 3.5700 that includes the process 3.5400, wherein the transmitting the speaker-related information from a mobile device includes operations performed by or at the following block(s).

At block 3.5704, the process performs transmitting the speaker-related information from a portable media player to the hearing device.

FIG. 3.58 is an example flow diagram of example logic illustrating an example embodiment of process 3.5300 of FIG. 3.53. The illustrated logic may be performed, for example, by a hearing device 120 and/or one or more components of the AAFS 100 described with respect to FIG. 2. More particularly, FIG. 3.58 illustrates a process 3.5800 that includes the process 3.5300, wherein the transmitting the speaker-related information to the hearing device from a computing system includes operations performed by or at the following block(s).

At block 3.5804, the process performs transmitting the speaker-related information from a server system. In some embodiments, some portion of the processing is performed on a server system that may be remote from the hearing device.

FIG. 3.59 is an example flow diagram of example logic illustrating an example embodiment of process 3.5800 of FIG. 3.58. The illustrated logic may be performed, for example, by a hearing device 120 and/or one or more components of the AAFS 100 described with respect to FIG. 2. More particularly, FIG. 3.59 illustrates a process 3.5900 that includes the process 3.5800, wherein the transmitting the speaker-related information from a server system includes operations performed by or at the following block(s).

At block 3.5904, the process performs transmitting the speaker-related information from a server system that resides in a data center.

FIG. 3.60 is an example flow diagram of example logic illustrating an example embodiment of process 3.100 of FIG. 3.1. The illustrated logic may be performed, for example, by a hearing device 120 and/or one or more components of the AAFS 100 described with respect to FIG. 2. More particularly, FIG. 3.60 illustrates a process 3.6000 that includes the process 3.100, wherein the informing the user of the speaker-related information via the hearing device includes operations performed by or at the following block(s).

At block 3.6004, the process performs transmitting the speaker-related information to earphones in communication with a mobile device that is operating as the hearing device.

FIG. 3.61 is an example flow diagram of example logic illustrating an example embodiment of process 3.100 of FIG. 3.1. The illustrated logic may be performed, for example, by a hearing device 120 and/or one or more components of the AAFS 100 described with respect to FIG. 2. More particularly, FIG. 3.61 illustrates a process 3.6100 that includes the process 3.100, wherein the informing the user of the speaker-related information via the hearing device includes operations performed by or at the following block(s).

At block 3.6104, the process performs transmitting the speaker-related information to earbuds in communication with a mobile device that is operating as the hearing device.

FIG. 3.62 is an example flow diagram of example logic illustrating an example embodiment of process 3.100 of FIG. 3.1. The illustrated logic may be performed, for example, by a hearing device 120 and/or one or more components of the AAFS 100 described with respect to FIG. 2. More particularly, FIG. 3.62 illustrates a process 3.6200 that includes the process 3.100, wherein the informing the user of the speaker-related information via the hearing device includes operations performed by or at the following block(s).

At block 3.6204, the process performs transmitting the speaker-related information to a headset in communication with a mobile device that is operating as the hearing device.

FIG. 3.63 is an example flow diagram of example logic illustrating an example embodiment of process 3.100 of FIG. 3.1. The illustrated logic may be performed, for example, by a hearing device 120 and/or one or more components of the AAFS 100 described with respect to FIG. 2. More particularly, FIG. 3.63 illustrates a process 3.6300 that includes the process 3.100, wherein the informing the user of the speaker-related information via the hearing device includes operations performed by or at the following block(s).

At block 3.6304, the process performs transmitting the speaker-related information to a pillow speaker in communication with a mobile device that is operating as the hearing device.

FIG. 3.64 is an example flow diagram of example logic illustrating an example embodiment of process 3.100 of FIG. 3.1. The illustrated logic may be performed, for example, by a hearing device 120 and/or one or more components of the AAFS 100 described with respect to FIG. 2. More particularly, FIG. 3.64 illustrates a process 3.6400 that includes the process 3.100, wherein the identifying the speaker includes operations performed by or at the following block(s).

At block 3.6404, the process performs identifying the speaker, performed on a mobile device that is operated by the user. As noted, In some embodiments a mobile device such as a smart phone may have sufficient processing power to perform a portion of the process, such as identifying the speaker.

FIG. 3.65 is an example flow diagram of example logic illustrating an example embodiment of process 3.6400 of FIG. 3.64. The illustrated logic may be performed, for example, by a hearing device 120 and/or one or more components of the AAFS 100 described with respect to FIG. 2. More particularly, FIG. 3.65 illustrates a process 3.6500 that includes the process 3.6400, wherein the identifying the speaker includes operations performed by or at the following block(s).

At block 3.6504, the process performs identifying the speaker, performed on a smart phone that is operated by the user.

FIG. 3.66 is an example flow diagram of example logic illustrating an example embodiment of process 3.6400 of FIG. 3.64. The illustrated logic may be performed, for example, by a hearing device 120 and/or one or more components of the AAFS 100 described with respect to FIG. 2. More particularly, FIG. 3.66 illustrates a process 3.6600 that includes the process 3.6400, wherein the identifying the speaker includes operations performed by or at the following block(s).

At block 3.6604, the process performs identifying the speaker, performed on a media device that is operated by the user.

FIG. 3.67 is an example flow diagram of example logic illustrating an example embodiment of process 3.100 of FIG. 3.1. The illustrated logic may be performed, for example, by a hearing device 120 and/or one or more components of the AAFS 100 described with respect to FIG. 2. More particularly, FIG. 3.67 illustrates a process 3.6700 that includes the process 3.100, wherein the determining speaker-related information includes operations performed by or at the following block(s).

At block 3.6704, the process performs determining speaker-related information, performed on a mobile device that is operated by the user.

FIG. 3.68 is an example flow diagram of example logic illustrating an example embodiment of process 3.6700 of FIG. 3.67. The illustrated logic may be performed, for example, by a hearing device 120 and/or one or more components of the AAFS 100 described with respect to FIG. 2. More particularly, FIG. 3.68 illustrates a process 3.6800 that includes the process 3.6700, wherein the determining speaker-related information includes operations performed by or at the following block(s).

At block 3.6804, the process performs determining speaker-related information, performed on a smart phone that is operated by the user.

FIG. 3.69 is an example flow diagram of example logic illustrating an example embodiment of process 3.6700 of FIG. 3.67. The illustrated logic may be performed, for example, by a hearing device 120 and/or one or more components of the AAFS 100 described with respect to FIG. 2. More particularly, FIG. 3.69 illustrates a process 3.6900 that includes the process 3.6700, wherein the determining speaker-related information includes operations performed by or at the following block(s).

At block 3.6904, the process performs determining speaker-related information, performed on a media device that is operated by the user.

FIG. 3.70 is an example flow diagram of example logic illustrating an example embodiment of process 3.100 of FIG. 3.1. The illustrated logic may be performed, for example, by a hearing device 120 and/or one or more components of the AAFS 100 described with respect to FIG. 2. More particularly, FIG. 3.70 illustrates a process 3.7000 that includes the process 3.100 and which further includes operations performed by or at the following blocks.

At block 3.7004, the process performs determining whether or not the user can name the speaker.

At block 3.7006, the process performs when it is determined that the user cannot name the speaker, informing the user of the speaker-related information via the hearing device. In some embodiments, the process only informs the user of the speaker-related information upon determining that the speaker does not appear to be able to name the speaker.

FIG. 3.71 is an example flow diagram of example logic illustrating an example embodiment of process 3.7000 of FIG. 3.70. The illustrated logic may be performed, for example, by a hearing device 120 and/or one or more components of the AAFS 100 described with respect to FIG. 2.

More particularly, FIG. 3.71 illustrates a process 3.7100 that includes the process 3.7000, wherein the determining whether or not the user can name the speaker includes operations performed by or at the following block(s).

At block 3.7104, the process performs determining whether the user has named the speaker. In some embodiments, the process listens to the user to determine whether the user has named the speaker.

FIG. 3.72 is an example flow diagram of example logic illustrating an example embodiment of process 3.7100 of FIG. 3.71. The illustrated logic may be performed, for example, by a hearing device 120 and/or one or more components of the AAFS 100 described with respect to FIG. 2. More particularly, FIG. 3.72 illustrates a process 3.7200 that includes the process 3.7100, wherein the determining whether the user has named the speaker includes operations performed by or at the following block(s).

At block 3.7204, the process performs determining whether the speaker has uttered a given name or surname of the speaker.

FIG. 3.73 is an example flow diagram of example logic illustrating an example embodiment of process 3.7100 of FIG. 3.71. The illustrated logic may be performed, for example, by a hearing device 120 and/or one or more components of the AAFS 100 described with respect to FIG. 2. More particularly, FIG. 3.73 illustrates a process 3.7300 that includes the process 3.7100, wherein the determining whether the user has named the speaker includes operations performed by or at the following block(s).

At block 3.7304, the process performs determining whether the speaker has uttered a nickname of the speaker.

FIG. 3.74 is an example flow diagram of example logic illustrating an example embodiment of process 3.7100 of FIG. 3.71. The illustrated logic may be performed, for example, by a hearing device 120 and/or one or more components of the AAFS 100 described with respect to FIG. 2. More particularly, FIG. 3.74 illustrates a process 3.7400 that includes the process 3.7100, wherein the determining whether the user has named the speaker includes operations performed by or at the following block(s).

At block 3.7404, the process performs determining whether the speaker has uttered a name of a relationship between the user and the speaker. In some embodiments, the user need not utter the name of the speaker, but instead may utter other information (e.g., a relationship) that may be used by the process to determine that user knows or can name the speaker.

FIG. 3.75 is an example flow diagram of example logic illustrating an example embodiment of process 3.7000 of FIG. 3.70. The illustrated logic may be performed, for example, by a hearing device 120 and/or one or more components of the AAFS 100 described with respect to FIG. 2. More particularly, FIG. 3.75 illustrates a process 3.7500 that includes the process 3.7000, wherein the determining whether or not the user can name the speaker includes operations performed by or at the following block(s).

At block 3.7504, the process performs determining whether the user has uttered information that is related to both the speaker and the user.

FIG. 3.76 is an example flow diagram of example logic illustrating an example embodiment of process 3.7100 of FIG. 3.71. The illustrated logic may be performed, for example, by a hearing device 120 and/or one or more components of the AAFS 100 described with respect to FIG. 2. More particularly, FIG. 3.76 illustrates a process 3.7600 that includes the process 3.7100, wherein the determining whether the user has named the speaker includes operations performed by or at the following block(s).

At block 3.7604, the process performs determining whether the user has named a person, place, thing, or event that the speaker and the user have in common. For example, the user may mention a visit to the home town of the speaker, a vacation to a place familiar to the speaker, or the like.

FIG. 3.77 is an example flow diagram of example logic illustrating an example embodiment of process 3.7000 of FIG. 3.70. The illustrated logic may be performed, for example, by a hearing device 120 and/or one or more components of the AAFS 100 described with respect to FIG. 2. More particularly, FIG. 3.77 illustrates a process 3.7700 that includes the process 3.7000, wherein the determining whether or not the user can name the speaker includes operations performed by or at the following block(s).

At block 3.7704, the process performs performing speech recognition to convert an utterance of the user into text data.

At block 3.7705, the process performs determining whether or not the user can name the speaker based at least in part on the text data.

FIG. 3.78 is an example flow diagram of example logic illustrating an example embodiment of process 3.7000 of FIG. 3.70. The illustrated logic may be performed, for example, by a hearing device 120 and/or one or more components of the AAFS 100 described with respect to FIG. 2. More particularly, FIG. 3.78 illustrates a process 3.7800 that includes the process 3.7000, wherein the determining whether or not the user can name the speaker includes operations performed by or at the following block(s).

At block 3.7804, the process performs when the user does not name the speaker within a predetermined time interval, determining that the user cannot name the speaker. In some embodiments, the process waits for a time period before jumping in to provide the speaker-related information.

3. Example Computing System Implementation

Figure 4:
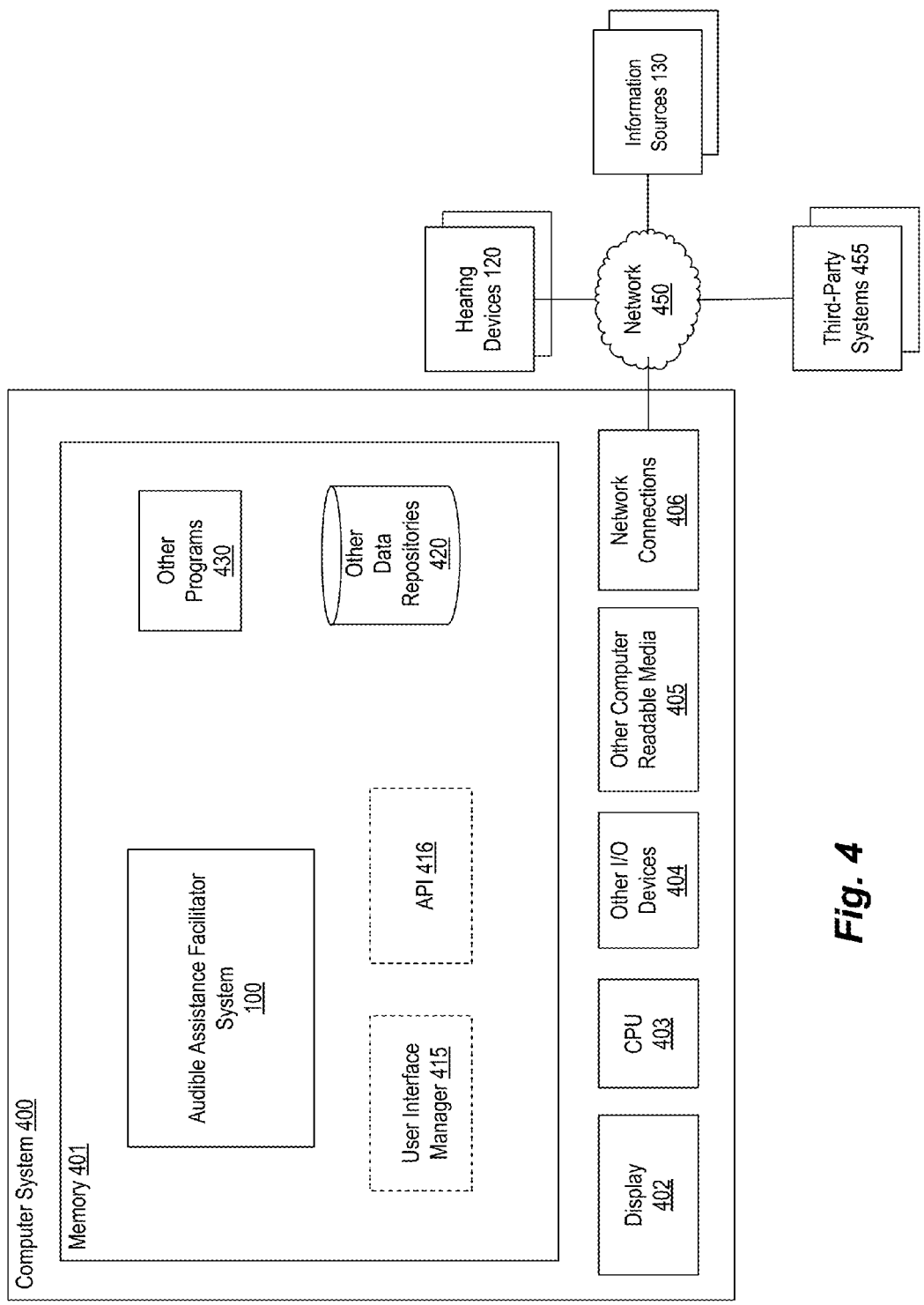
FIG. 4 is an example block diagram of an example computing system for implementing an audible assistance facilitator system according to an example embodiment.

FIG. 4 is an example block diagram of an example computing system for implementing an audible assistance facilitator system according to an example embodiment. In particular, FIG. 4 shows a computing system 400 that may be utilized to implement an AAFS 100.

Note that one or more general purpose or special purpose computing systems/devices may be used to implement the AAFS 100. In addition, the computing system 400 may comprise one or more distinct computing systems/devices and may span distributed locations. Furthermore, each block shown may represent one or more such blocks as appropriate to a specific embodiment or may be combined with other blocks. Also, the AAFS 100 may be implemented in software, hardware, firmware, or in some combination to achieve the capabilities described herein.

In the embodiment shown, computing system 400 comprises a computer memory ("memory") 401, a display 402, one or more Central Processing Units ("CPU") 403, Input/Output devices 404 (e.g., keyboard, mouse, CRT or LCD display, and the like), other computer-readable media 405, and network connections 406. The AAFS 100 is shown residing in memory 401. In other embodiments, some portion of the contents, some or all of the components of the AAFS 100 may be stored on and/or transmitted over the other computer-readable media 405. The components of the AAFS 100 preferably execute on one or more CPUs 403 and recommend content items, as described herein. Other code or programs 430 (e.g., an administrative interface, a Web server, and the like) and potentially other data repositories, such as data repository 420, also reside in the memory 401, and preferably execute on one or more CPUs 403. Of note, one or more of the components in FIG. 4 may not be present in any specific implementation. For example, some embodiments may not provide other computer readable media 405 or a display 402.

The AAFS 100 interacts via the network 450 with hearing devices 120, speaker-related information sources 130, and third-party systems/applications 455. The network 450 may be any combination of media (e.g., twisted pair, coaxial, fiber optic, radio frequency), hardware (e.g., routers, switches, repeaters, transceivers), and protocols (e.g., TCP/IP, UDP, Ethernet, Wi-Fi, WiMAX) that facilitate communication between remotely situated humans and/or devices. The third-party systems/applications 455 may include any systems that provide data to, or utilize data from, the AAFS 100, including Web browsers, e-commerce sites, calendar applications, email systems, social networking services, and the like.

The AAFS 100 is shown executing in the memory 401 of the computing system 400. Also included in the memory are a user interface manager 415 and an application program interface ("API") 416. The user interface manager 415 and the API 416 are drawn in dashed lines to indicate that in other embodiments, functions performed by one or more of these components may be performed externally to the AAFS 100.

The UI manager 415 provides a view and a controller that facilitate user interaction with the AAFS 100 and its various components. For example, the UI manager 415 may provide interactive access to the AAFS 100, such that users can configure the operation of the AAFS 100, such as by providing the AAFS 100 credentials to access various sources of speaker-related information, including social networking services, email systems, document stores, or the like. In some embodiments, access to the functionality of the UI manager 415 may be provided via a Web server, possibly executing as one of the other programs 430. In such embodiments, a user operating a Web browser executing on one of the third-party systems 455 can interact with the AAFS 100 via the UI manager 415.

The API 416 provides programmatic access to one or more functions of the AAFS 100. For example, the API 416 may provide a programmatic interface to one or more functions of the AAFS 100 that may be invoked by one of the other programs 430 or some other module. In this manner, the API 416 facilitates the development of third-party software, such as user interfaces, plug-ins, adapters (e.g., for integrating functions of the AAFS 100 into Web applications), and the like.

In addition, the API 416 may be in at least some embodiments invoked or otherwise accessed via remote entities, such as code executing on one of the hearing devices 120, information sources 130, and/or one of the third-party systems/applications 455, to access various functions of the AAFS 100. For example, an information source 130 may push speaker-related information (e.g., emails, documents, calendar events) to the AAFS 100 via the API 416. The API 416 may also be configured to provide management widgets (e.g., code modules) that can be integrated into the third-party applications 455 and that are configured to interact with the AAFS 100 to make at least some of the described functionality available within the context of other applications (e.g., mobile apps).

In an example embodiment, components/modules of the AAFS 100 are implemented using standard programming techniques. For example, the AAFS 100 may be implemented as a "native" executable running on the CPU 403, along with one or more static or dynamic libraries. In other embodiments, the AAFS 100 may be implemented as instructions processed by a virtual machine that executes as one of the other programs 430. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), and declarative (e.g., SQL, Prolog, and the like).

The embodiments described above may also use either well-known or proprietary synchronous or asynchronous client-server computing techniques. Also, the various components may be implemented using more monolithic programming techniques, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the described functions.

In addition, programming interfaces to the data stored as part of the AAFS 100, such as in the data store 417, can be available by standard mechanisms such as through C, C++, C#, and Java APIs; libraries for accessing files, databases, or other data repositories; through scripting languages such as XML; or through Web servers, FTP servers, or other types of servers providing access to stored data. The data store 417 may be implemented as one or more database systems, file systems, or any other technique for storing such information, or any combination of the above, including implementations using distributed computing techniques.

Different configurations and locations of programs and data are contemplated for use with techniques of described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions described herein.

Furthermore, in some embodiments, some or all of the components of the AAFS 100 may be implemented or provided in other manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the components and/or data structures may be stored on tangible, non-transitory storage mediums. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

From the foregoing it will be appreciated that, although specific embodiments have been described herein for purposes of illustration, various modifications may be made without deviating from the spirit and scope of this disclosure. For example, the methods, techniques, and systems for audible assistance are applicable to other architectures or in other settings. For example, instead of providing assistance to users who are engaged in face-to-face conversation, at least some of the techniques may be employed in remote communication, such as telephony systems (e.g., POTS, Voice Over IP, conference calls), online voice chat systems, and the like. Also, the methods, techniques, and systems discussed herein are applicable to differing protocols, communication media (optical, wireless, cable, etc.) and devices (e.g., desktop computers, wireless handsets, electronic organizers, personal digital assistants, tablet computers, portable email machines, game machines, pagers, navigation devices, etc.).

The invention claimed is:

1. A method for providing audible assistance via a hearing device, the method comprising:
   receiving data representing a speech signal obtained at a hearing device associated with a user, the speech signal representing an utterance of a speaker;
   identifying the speaker based on the data representing the speech signal;
   determining speaker-related information associated with the identified speaker;
   determining whether or not the user can name the speaker, by determining whether the user has named the speaker; and
   when it is determined that the user cannot name the speaker, informing the user of the speaker-related information via the hearing device, wherein the informing the user of the speaker-related information via the hearing device includes: informing the user of an identifier of the speaker.

2. The method of claim 1, wherein the informing the user of the speaker-related information via the hearing device includes: informing the user of information aside from identifying information related to the speaker.

3. The method of claim 1, wherein the informing the user of the speaker-related information via the hearing device includes: informing the user of an organization to which the speaker belongs.

4. The method of claim 3, wherein the informing the user of an organization includes: informing the user of a company associated with the speaker.

5. The method of claim 1, wherein the informing the user of the speaker-related information via the hearing device includes: informing the user of a previously transmitted communication referencing the speaker, wherein the previously transmitted communication is an email or text message transmitted between the speaker and the user.

6. The method of claim 1, wherein the informing the user of the speaker-related information via the hearing device includes: informing the user of an event involving the user and the speaker.

7. The method of claim 6, wherein the informing the user of an event includes: informing the user of a previously occurring event, a future event, a project, a meeting, and/or a deadline.

8. The method of claim 1, wherein the determining speaker-related information includes: accessing information items associated with the speaker.

9. The method of claim 8, wherein the accessing information items associated with the speaker includes: searching for information items that reference the speaker, searching stored emails to find emails that reference the speaker, searching stored text messages to find text messages that reference the speaker, accessing a social networking service to find messages or status updates that reference the speaker, accessing a calendar to find information about appointments with the speaker, and/or accessing a document store to find documents that reference the speaker.

10. The method of claim 1, wherein the identifying the speaker includes: performing voice identification based on the received data to identify the speaker.

11. The method of claim 10, wherein the performing voice identification includes: comparing properties of the speech signal with properties of previously recorded speech signals from multiple distinct speakers.

12. The method of claim 11, further comprising: processing voice messages from the multiple distinct speakers to generate voice print data for each of the multiple distinct speakers.

13. The method of claim 10, wherein the performing voice identification includes: processing telephone voice messages stored by a voice mail service.

14. The method of claim 1, wherein the identifying the speaker includes:
   performing speech recognition to convert the received data into text data; and
   identifying the speaker based on the text data.

15. The method of claim 14, wherein the identifying the speaker based on the text data includes: finding a document that references the speaker and that includes one or more words in the text data.

16. The method of claim 14, further comprising:
   retrieving information items that reference the text data; and
   informing the user of the retrieved information items.

17. The method of claim 14, further comprising:
   converting the text data into audio data that represents a voice of a different speaker; and
   causing the audio data to be played through the hearing device.

18. The method of claim 14, wherein the performing speech recognition includes: performing speech recognition based at least in part on a language model associated with the speaker.

19. The method of claim 18, wherein the performing speech recognition based at least in part on a language model associated with the speaker includes: generating the language model based on communications generated by the speaker.

20. The method of claim 19, wherein the generating the language model based on communications generated by the speaker includes: generating the language model based on emails transmitted by the speaker, documents authored by the speaker, and/or social network messages transmitted by the speaker.

21. The method of claim 1, further comprising:
receiving data representing a speech signal that represents an utterance of the user; and
identifying the speaker based on the data representing a speech signal that represents an utterance of the user.

22. The method of claim 21, wherein the identifying the speaker based on the data representing a speech signal that represents an utterance of the user includes: determining whether the utterance of the user includes a name of the speaker.

23. The method of claim 1, wherein the identifying the speaker includes:
receiving context information related to the user; and
identifying the speaker, based on the context information.

24. The method of claim 23, wherein the receiving context information related to the user includes:
receiving an indication of a location of the user; and
determining a plurality of persons with whom the user commonly interacts at the location.

25. The method of claim 24, wherein the receiving an indication of a location of the user includes: receiving a GPS location from a mobile device of the user, receiving a network identifier that is associated with the location, receiving an indication that the user is at a workplace, and/or receiving an indication that the user is at a residence.

26. The method of claim 23, wherein the receiving context information related to the user includes: receiving information about a communication that references the speaker, the context information including a message and/or a document that references the speaker.

27. The method of claim 1, further comprising:
receiving data representing an ongoing conversation amongst multiple speakers;
identifying the multiple speakers based on the data representing the ongoing conversation; and
as each of the multiple speakers takes a turn speaking during the ongoing conversation, informing the user of a name or other speaker-related information associated with the speaker.

28. The method of claim 1, further comprising:
developing a corpus of speaker data by recording speech from a plurality of speakers; and
identifying the speaker based at least in part on the corpus of speaker data.

29. The method of claim 28, further comprising: generating a speech model associated with each of the plurality of speakers, based on the recorded speech.

30. The method of claim 28, further comprising:
receiving feedback regarding accuracy of the speaker-related information; and
training a speech processor based at least in part on the received feedback.

31. The method of claim 1, wherein the informing the user of the speaker-related information via the hearing device includes: transmitting the speaker-related information to a hearing device configured to amplify speech for the user.

32. The method of claim 1, wherein the informing the user of the speaker-related information via the hearing device includes: transmitting the speaker-related information to the hearing device from a computing system that is remote from the hearing device.

33. The method of claim 32, wherein the transmitting the speaker-related information to the hearing device from a computing system includes: transmitting the speaker-related information from a mobile device that is operated by the user, that is in communication with the hearing device, and that is a smart phone and/or a portable media player.

34. The method of claim 32, wherein the transmitting the speaker-related information to the hearing device from a computing system includes: transmitting the speaker-related information from a server system.

35. The method of claim 34, wherein the transmitting the speaker-related information from a server system includes: transmitting the speaker-related information from a server system that resides in a data center.

36. The method of claim 1, wherein the informing the user of the speaker-related information via the hearing device includes: transmitting the speaker-related information to earphones in communication with a mobile device that is operating as the hearing device, transmitting the speaker-related information to earbuds in communication with a mobile device that is operating as the hearing device, transmitting the speaker-related information to a headset in communication with a mobile device that is operating as the hearing device, and/or transmitting the speaker-related information to a pillow speaker in communication with a mobile device that is operating as the hearing device.

37. The method of claim 1, wherein the identifying the speaker includes: identifying the speaker, performed on a mobile device that is operated by the user and that is a smart phone and/or a personal media device.

38. The method of claim 1, wherein the determining speaker-related information includes: determining speaker-related information, performed on a mobile device that is operated by the user and that is a smart phone and/or a personal media device.

39. The method of claim 1, wherein the determining whether the user has named the speaker includes: determining whether the speaker has uttered a given name or surname of the speaker, determining whether the speaker has uttered a nickname of the speaker, and/or determining whether the speaker has uttered a name of a relationship between the user and the speaker.

40. The method of claim 1, wherein the determining whether or not the user can name the speaker includes: determining whether the user has uttered information that is related to both the speaker and the user.

41. The method of claim 1, wherein the determining whether the user has named the speaker includes: determining whether the user has named a person, place, thing, or event that the speaker and the user have in common.

42. The method of claim 1, wherein the determining whether or not the user can name the speaker includes:
performing speech recognition to convert an utterance of the user into text data; and
determining whether or not the user can name the speaker based at least in part on the text data.

43. The method of claim 1, wherein the determining whether or not the user can name the speaker includes: when the user does not name the speaker within a predetermined time interval, determining that the user cannot name the speaker.

* * * * *